United States Patent [19]

Kitazima et al.

[11] Patent Number: 4,770,502

[45] Date of Patent: Sep. 13, 1988

[54] FERROELECTRIC LIQUID CRYSTAL MATRIX DRIVING APPARATUS AND METHOD

[75] Inventors: Masaaki Kitazima, Hitachiohta; Katsumi Kondo, Hitachi, both of Japan

[73] Assignee: Hitachi, Ltd., Tokyo, Japan

[21] Appl. No.: 772

[22] Filed: Jan. 6, 1987

[30] Foreign Application Priority Data

Jan. 10, 1986 [JP] Japan .................................... 61-2084
Mar. 5, 1986 [JP] Japan .................................... 61-46171
Mar. 17, 1986 [JP] Japan .................................... 61-56834

[51] Int. Cl.⁴ ................................................ G02F 1/13
[52] U.S. Cl. ................................ 350/350 S; 350/333
[58] Field of Search ............................ 350/333, 350 S

[56] References Cited

U.S. PATENT DOCUMENTS 4,655,561 4/1987 Kanbe et al. .................. 350/333 X
4,702,560 10/1987 Endo et al. .......................... 350/333
4,711,531 12/1987 Masubuchi ...................... 350/350 S
4,715,688 12/1987 Harada et al. ................. 350/333 X
4,725,129 2/1988 Kondo et al. .................. 350/350 S

FOREIGN PATENT DOCUMENTS 60-33535 2/1985 Japan .
60-123825 7/1985 Japan .

*Primary Examiner*—Stanley D. Miller
*Assistant Examiner*—Richard F. Gallivan
*Attorney, Agent, or Firm*—Antonelli, Terry & Wands

[57] ABSTRACT

A liquid crystal matrix driving method capable of shortening the re-write time of a picture surfaces is disclosed. In accordance with this method, pixels are brought to the light ON state or OFF state by changing in advance the light transmission state by utilizing the bistability of the display of the ferroelectric liquid crystal, a voltage keeping the light ON state or an OFF voltage is then applied to the pixels when they are already in the ON state in accordance with a time-division driving method such as line sequence scanning driving or dot sequence scanning driving, and a voltage keeping the OFF state or an ON voltage is applied when the pixels are already in the OFF state.

8 Claims, 41 Drawing Sheets

(1) : INITIALIZATION PERIOD
(2) : NON-SELECTION PERIOD
(3) : SELECTION PERIOD
(4) : STOP PERIOD 21 mole %

21 mole %

29 mole %

29 mole %

A: INITIALIZATION (OFF)
B: WRITING (ON)
C: HOLDING (OFF)
D: HOLDING (OFF)
E: HOLDING (OFF)
F: HOLDING

A: INITIALIZATION (ON)
B: WRITING (OFF)
C: HOLDING (ON)
D: HOLDING (ON)
E: HOLDING (ON)
F: HOLDING

A: INITIALIZATION (OFF)
B: WRITING (ON)
C: HOLDING (OFF)
D: HOLDING (OFF)
E: HOLDING (OFF)
F: HOLDING

A: INITIALIZATION (ON)
B: WRITING (OFF)
C: HOLDING (ON)
D: HOLDING (ON)
E: HOLDING (ON)
F: HOLDING

A: INITIALIZATION (OFF)
B: WRITING (ON)
C: HOLDING (OFF)
D: HOLDING (OFF)
E: HOLDING (OFF)
F: HOLDING

A: INITIALIZATION (ON)
B: WRITING (OFF)
C: HOLDING (ON)
D: HOLDING (ON)
E: HOLDING (ON)
F: HOLDING

A: INITIALIZATION (ON)
B: WRITING (OFF)
C: HOLDING (ON)
D: HOLDING (ON)
E: HOLDING (ON)
F: HOLDING

A: INITIALIZATION (ON)
B: WRITING (OFF)
C: HOLDING (ON)
D: HOLDING (ON)
E: HOLDING (ON)
F: HOLDING

FERROELECTRIC LIQUID CRYSTAL MATRIX DRIVING APPARATUS AND METHOD

BACKGROUND OF THE INVENTION

This invention relates to a liquid crystal matrix device using a ferroelectric liquid crystal having a smectic phase, and more particularly to a liquid crystal display device suitable for large scale display.

Ferroelectric liquid crystal molecules assume a layered structure and a spiral structure such as shown in FIG. 2 of the accompanying drawings. In the drawings, reference numeral 1 represents liquid crystal molecules and 2 represents spontaneous polarization.

When an electric field E above a threshold voltage is applied vertically to a spiral axis, the molecules move inside the layer while keeping the layered structure and the spiral gets loosened so that a permanent dipole moment vertical to the long major axis of each molecule becomes parallel to the electric field. Accordingly, the molecules are oriented parallel to one another not only in the layers but also between the layers as shown in FIG. 2(*a*).

If the direction of the electric field is reversed, the liquid crystal molecules assume the state shown in FIG. 2(*c*). In other words, two states where the liquid crystal molecules are inclined by $\pm\theta$ can be established by selecting the direction of the electric field, and a display device or an optical shutter device can be produced by either utilizing birefringence or adding a dichroic pigment to the liquid crystal.

When the electric field is removed, the ferroelectric liquid crystal molecules generally return to the original spiral structure due to the orientation elastic righting moment as shown in FIG. 2(*b*), but it is known in the art that when the liquid crystal layer is as thin as about 1 μm, for example, a bistable state where the spiral remains substantially loosened such as shown in FIGS. 2(*a*) and (*c*) can be established even when the field is zero.

One example of the conventional time-division driving methods of the ferroelectric liquid crystal exhibiting such a bistable state is shown in FIGS. 3 and 4.

FIG. 3 shows the outline of a liquid crystal device. A liquid crystal as a ferroelectric liquid crystal exhibiting a chiral smectic phase is sealed between X and Y electrodes 3 and 4.

FIG. 4 shows driving waveforms to be applied to the X and Y electrodes 3, 4 when a pixel A is turned ON while a pixel B is turned OFF.

A voltage having a voltage value of $\pm 2$ V is sequentially applied to the X electrode, while a voltage having a voltage value of $\pm$V is applied to the Y electrode. As a result, the $\pm 3$ V voltage or $\pm$V voltage is applied to the pixel A, which is turned ON, while the $-3$ V voltage or $\pm$V voltage is applied to the pixel B, which is turned OFF.

In accordance with this driving method, the application time $\Delta t$ of $\pm 3$ V voltage which determines the display state of the pixels is $\frac{1}{4}$ of the selection time $T_s$ of one line. Therefore, the optical response time of the liquid crystal must be below $\frac{1}{4}$ $T_s$.

On the other hand, the optical response time of the smectic liquid crystals available at present is from about 0.5 to about 1 ms. Therefore, if the number of scanning lines is $N=500$, the re-write time of one picture surface is as long as about two seconds because the selection time $T_s$ of one line is $T_s=4$ ms.

As the prior art references relating to the driving methods of the kind described above, mention can be made of Japanese Patent Laid-Open Nos. 123,825/1985 and 33535/1985.

Here, the driving method disclosed in Japanese Patent Laid-Open No. 123,825/1985 will be explained.

This driving method makes scanning twice, that is, ON scanning and OFF scanning, to re-write the display content of one picture surface. FIGS. 49(*a*) and 49(*b*) show the voltage waveforms to be applied to scanning electrode (common electrode) and to signal electrode (segment electrode) in ON and OFF scanning, respectively.

In the drawings, symbols $\phi_{Yl}$, $\phi_{Yl}$, $\phi_{Yd}$ and $\phi_{Yd}$ denote the scanning voltages to be applied to the scanning electrode while $\phi_{Xl}$, $\phi_{Xl}$, $\phi_{Xd}$ and $\phi_{Xd}$ represent the signal voltages to be applied to the signal electrode.

FIG. 50 shows the voltage which is determined from FIGS. 49(*a*) and (*b*) and applied to the liquid crystal. This voltage represents the waveform when the matrix liquid crystal consisting of the signal electrodes 301 and the scanning electrodes 302 shown in FIG. 51 is driven on the time division basis.

The voltage applied to a pixel 303*a* when setting the pixels 303*a*–303*e* to the display state shown in the drawing is $V_{Yl}$–$V_{Xl}$. Here, the display ON state is set when a negative voltage ($-V_{ap}$) is applied to the liquid crystal.

As shown in the drawing, a $\pm\frac{1}{3}V_{ap}$ bias voltage is applied during the non-selection period of the pixel 303*a*, but the application time of the same polarity is not constant but changes in two stages.

On the other hand, it is known that the optical threshold voltage of ferroelectric liquid crystals is not clear with respect to a d.c. voltage. Therefore, the liquid crystal responds to the bias voltage and the peak value of a transmission light quantity T becomes greater with a longer application time of the same polarity and becomes smaller with a shorter application time. As a result, during the re-write operation of information, variance occurs in the light transmission state for the reasons described above and the display quality deteriorates. In other words, flicker of the display occurs on a display and the display quality drops during the rewrite operation of the picture surface.

As described above, when applied to a large picture surface high precision liquid crystal panel having a large number of scanning lines, the conventional driving methods involve the practical problems that a long time is necessary for re-writing the entire picture surface and variance occurs in the light transmission state.

SUMMARY OF THE INVENTION

In a time-division driving method of a ferroelectric liquid crystal exhibiting bistability, it is a first object of the present invention to provide a driving method of a liquid crystal which can shorten the re-write time of a picture surface.

It is a second object of the present invention to provide a driving method of a liquid crystal which can eliminate the problems of the prior art described above and can accomplish a ferroelectric liquid crystal device having high quality.

The first characterizing feature of the present invention lies in that the pixels are brought to the light ON state or OFF state by changing in advance the light transmission state by utilizing the bistability of the display of the ferroelectric liquid crystal, a voltage keeping the light ON state or an OFF voltage is then applied to the pixels when they are already in the ON state in accordance with a time-division driving method such as line sequence scanning driving or dot sequence scanning driving, and a voltage keeping the OFF state or an ON voltage is applied when the pixels are already in the OFF state.

In accordance with the first characterizing feature of the invention described above, since the desired pixels are all set once to the initial state, it is necessary only to select other two kinds of voltages for time-division driving. Accordingly, the re-write time of the picture surface can be shortened.

The second characterizing feature of the present invention resides in that during a selection period in which the light transmission state of the liquid crystal device is determined, a first voltage is applied primarily to the ferroelectric liquid crystal so that the direction of the ferroelectric liquid crystal molecules in the proximity of the scanning electrodes and the signal electrodes is substantially in agreement with the direction of the ferroelectric liquid crystal molecules at about an intermediate portion between the scanning electrodes and the signal electrodes; and during the non-selection period for keeping the light transmission state of the ferroelectric liquid crystal device, a mixture of a second voltage (bias voltage), which brings the direction of the liquid crystal molecules in the proximity of the scanning electrodes and the signal electrodes into substantial conformity with the direction during the selection period but differentiates the direction of the ferroelectric liquid crystal molecules in the proximity of the scanning electrodes and the signal electrodes from the direction of the liquid crystal molecules at the intermediate portion, and a third voltage (erasing voltage), which brings the direction of the ferroelectric liquid crystal molecules in the proximity of the scanning electrodes and the signal electrodes into substantial conformity with the direction during the selection period and the direction of the ferroelectric liquid crystal molecules at about the intermediate portion between the scanning electrodes and the signal electrodes into substantial conformity with the direction during the selection period, is applied to the ferroelectric liquid crystal.

In accordance with a preferred embodiment of the second characterizing feature of the invention described above, the voltage value and pulse width of the bias voltage to be applied to the liquid crystal in the non-selection period are selected so that the liquid crystal does not reach the transmission light ON or OFF state, and a substantially 0 V voltage is inserted in the prestage or poststage, or both of, the non-selection period of one line for a period exceeding the relaxation time of the liquid crystal when the bias voltage is applied thereto.

The second characterizing feature of the present invention is based upon the relaxation phenomenon that when a third voltage (a voltage not sufficient to inverse the ON or OFF state of the liquid crystal) is applied to the liquid crystal which is under the ON or OFF state, the liquid crystal returns to the original state, and the voltage (about 0 V) which returns the liquid crystal to the original state for a period longer at least than the relaxation period is inserted into the bias voltage in order to prevent variance of the light transmission state.

BRIEF DESCRIPTION OF THE DRAWINGS

FIGS. 3, 4 and 49 through 51 show prior art examples;

FIGS. 8 through 10*a*, and 10*b*, 42 and 43 show the characteristics of liquid crystals;

DESCRIPTION OF THE PREFERRED EMBODIMENTS

Figure 5A:
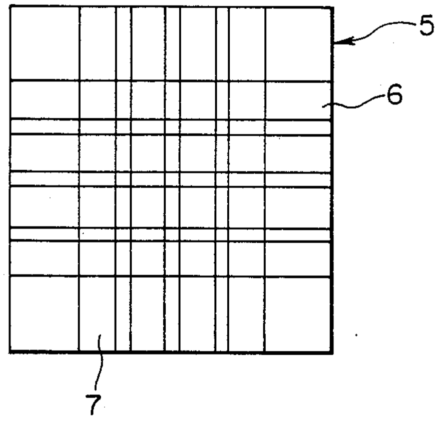
FIGS. 5*a*, 5*b*, 6 and 7 show one example of the structure of a liquid crystal panel and a liquid crystal material.
Figure 5B:
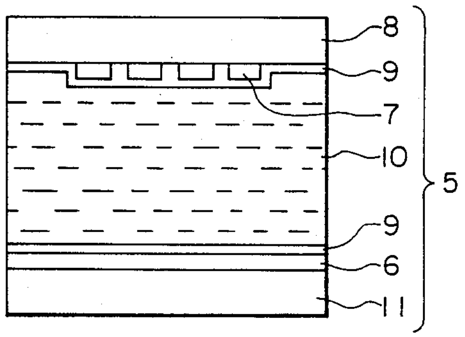

Hereinafter, preferred embodiments of the present invention will be described in detail. FIG. 5 shows schematically the structure of a liquid crystal display device 5. The device is produced by arranging a substrate 8 such as a glass sheet on which signal (Y) electrodes 7 the number of which is plural are formed and a substrate 11 such as a glass sheet or plastics on which scanning (X) electrodes 6 the number of which is plural are formed in such a manner as to face each other with a predetermined gap between them, and then inserting a ferroelectride liquid crystal 10 exhibiting a chiral smectic phase between these substrates.

A liquid crystal orientation film 9 is formed by spin-coating an organic matter (polyimide) by a spinner and then rubbing the film. The orientation treatment may be made to only one of the substrates or need not be made for both substrates without deteriorating the optical memory operation that will be described elsewhere.

Figure 6:
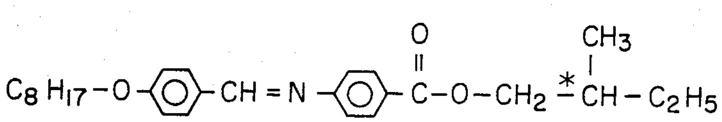
Figure 6:
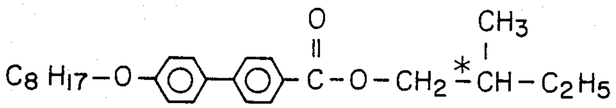
Figure 6:
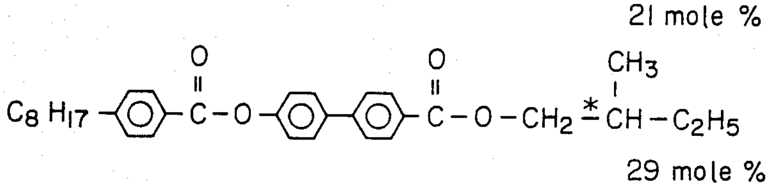
Figure 6:
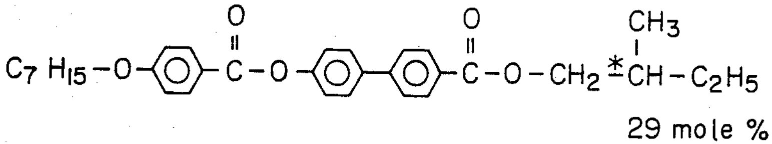
Figure 7:
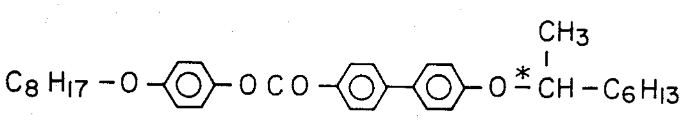

A mixed liquid crystal shown in FIG. 6 or a liquid crystal shown in FIG. 7 is used as the liquid crystal 10 described above. Display in this case may be of a birefringence type in which two polarizers are fitted onto the substrate of the liquid crystal display device 5 or of a guest-host type in which a dichroic pigment is sealed in the liquid crystal 10. Particularly in the case of the guest-host type display, the liquid crystal shown in FIG. 7 can be used most suitably.

Next, one example of the arranging methods of liquid crystal molecules will be described. After being heated to an isotropic liquid phase, the liquid crystal is annealed at a rate of about 0.1° C./min. As a result, a chiral smectic C phase is attained in which the long axis of the molecules is inclined from a layer normal.

Figure 8:
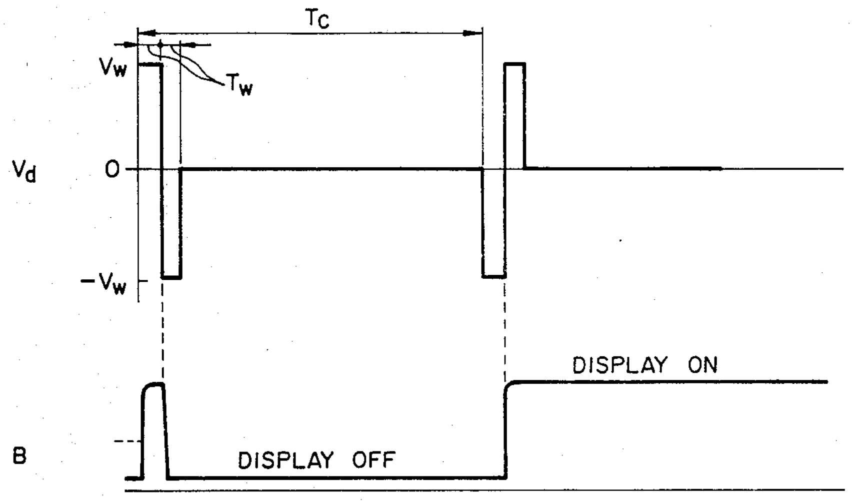

FIG. 8(*a*) shows the relation between the axes A, P of polarization of the polarizer and the liquid crystal molecules **212*a*, 212*b* in the birefringence display and FIG. 8**(*b*) shows the relation between the axis of polarization A of the polarizer and the liquid crystal molecules **213*a*, 213*b*** in the guest-host display. In either case, display becomes dark when the liquid crystal molecules are aligned along the axis of polarization A and the light is cut off (light OFF state) and becomes bright (light ON state) when they are inclined by 2¼ and the light is passed (on the right side in the drawings), on the contrary.

Figure 9:
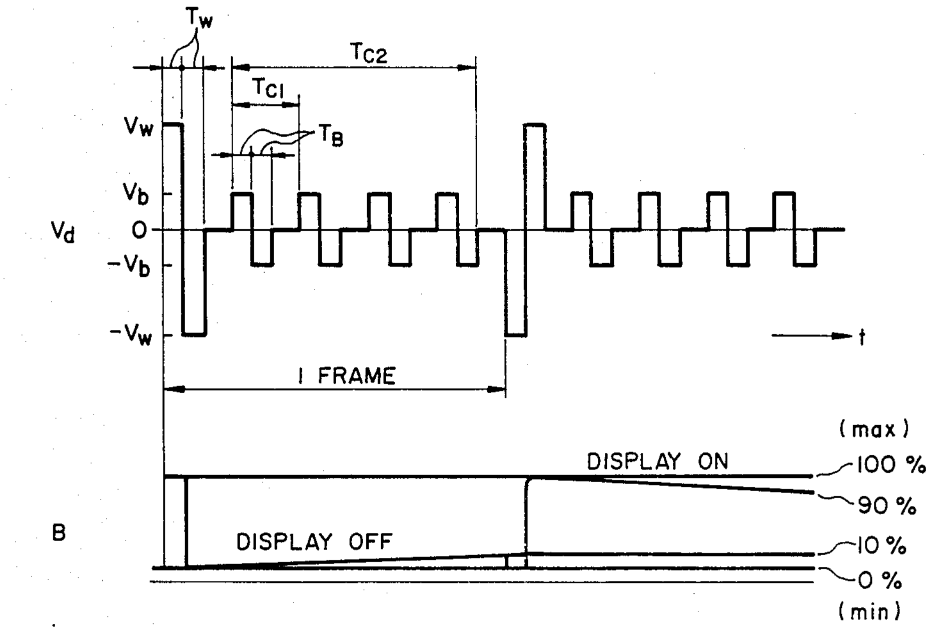

FIGS. 8 and 9 show the electro-optical characteristics of the liquid crystal display device obtained in the manner described above. FIG. 8 shows the relation between the driving voltage $V_d$ of the liquid crystal display device and its optical response waveform B. As shown in the diagram, the display mode is either the light ON state (positive polarity) or the light OFF state (negative polarity) depending upon the polarity of the driving voltage $V_d$. The liquid crystal device exhibits the memory operation (bistability) which keeps the light ON state or light OFF state even after the negative or positive polarity is removed (0 V). As a result of actual measurement, this memory time is found to be more than some dozens of seconds.

The driving voltage $V_d$ of the liquid crystal shown in FIG. 8 represents the waveform when the liquid crystal is driven statically. On the other hand, FIG. 9 shows an example of the driving voltage waveforms when the liquid crystal matrix panel is driven on the time-division basis and an example of the optical response waveforms at that time.

The driving voltage $V_d$ consists of a write voltage (voltage value $\pm V_w$) and a bias voltage (voltage value $\pm V_b$). Each of the pixels of the liquid crystal is selected once in one frame period and the write voltage described above is applied thereto. The liquid crystal is brought into the light OFF state or the display ON state in accordance with the polarity of the voltage that is finally applied in this selection period, and keeps this state until a write voltage is applied afresh.

On the other hand, in the non-selection period in which the write voltage is not applied, the bias voltage described above is applied. As a result, the brightness of the liquid crystal determined by the write voltage changes in accordance with this bias voltage. The inventors of this invention confirmed from the result of experiments that this change quantity depends upon the voltage value $\pm V_b$ of the bias voltage, the pulse width $T_b$, the pulse period $T_{c1}$ and the application time $T_{c2}$.

Figure 10A:
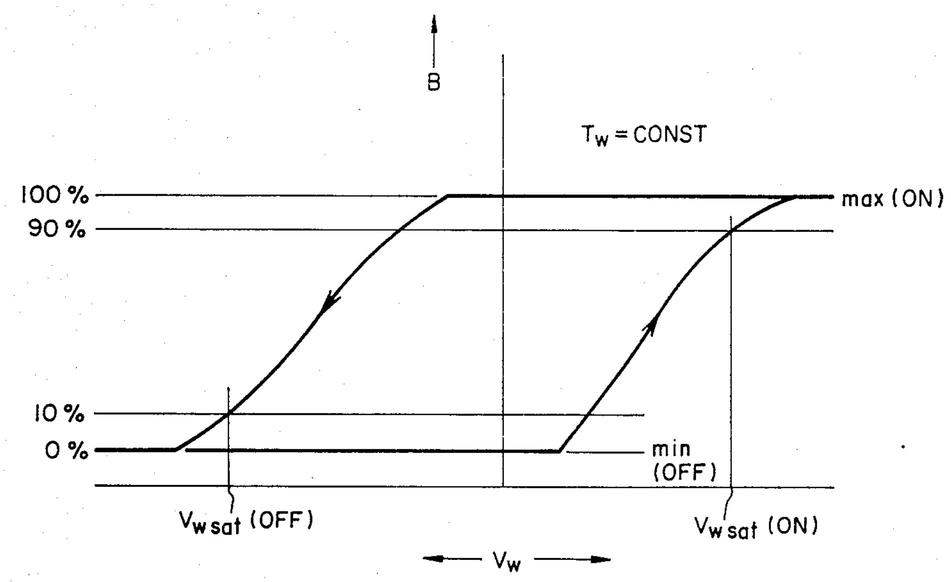
Figure 10B:
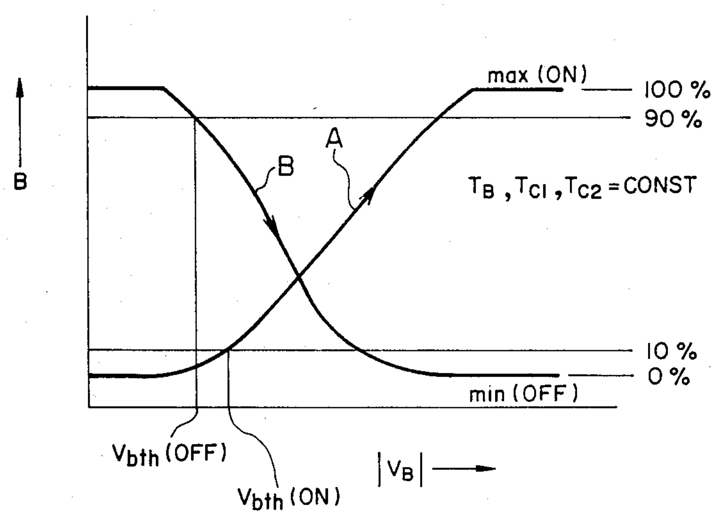

Next, FIG. 10 shows the relation between the write voltage and the bias voltage versus the brightness of the liquid crystal. FIG. 10(*a*) shows the write voltage-vs-brightness characteristics. The display state changes to the ON or OFF state depending upon the polarity of the write voltage, and the peak value of the write voltage at which the brightness B increases to 90% is hereby defined as an ON saturation value $V_{w\,sat(ON)}$ and the peak value at which the brightness drops to 10%, as an OFF saturation value $V_{w\,sat(OFF)}$.

FIG. 10(*b*) shows the bias voltage-vs-brightness characteristics in the application period $t_{c1}$ of the bias voltage shown in FIG. 9.

Characteristics A represent those when the initial state of brightness is brought into the OFF state while characteristics B represent those when the initial state is brought into the ON state, on the contrary. In the characteristics shown in the diagram, the peak value of the bias voltage when the brightness B drops to 90% is defined as an "OFF threshold voltage $V_{bth(OFF)}$" and the peak value when the brightness increases to 10% is defined as an "ON threshold voltage $V_{bth(ON)}$", respectively.

In matrix driving, the write voltage and the bias voltage must satisfy the following relation:

$$|V_w| \geqq V_{w\,sat(ON)},\ V_{w\,sat(OFF)} \quad (1)$$

$$|V_b| \leqq V_{bth(ON)},\ V_{bth(OFF)} \quad (2)$$

Figure 1A:
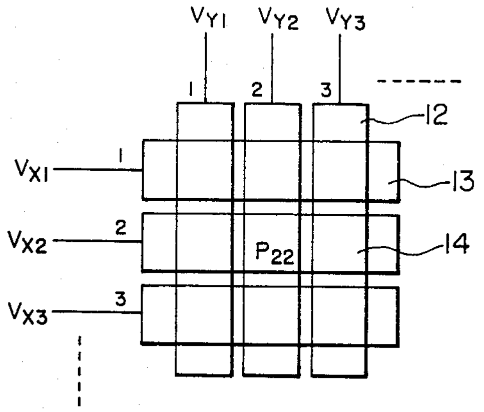
FIGS. 1*a*, 1*b*, 28*a*, 28*b* and 3 are conceptual views of one embodiment of the present invention.
Figure 1B:
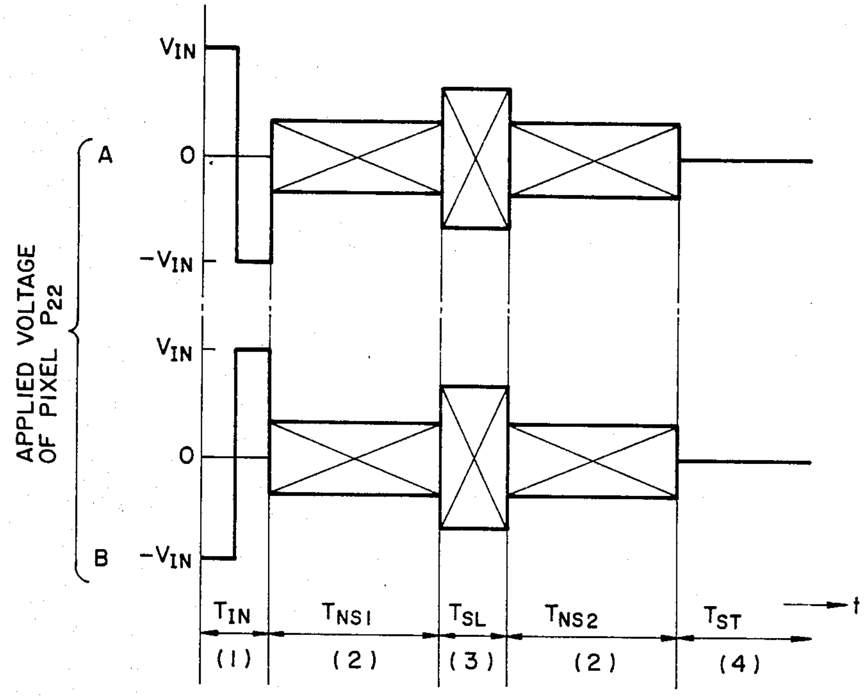
Figures 2A, 2B, 2C:
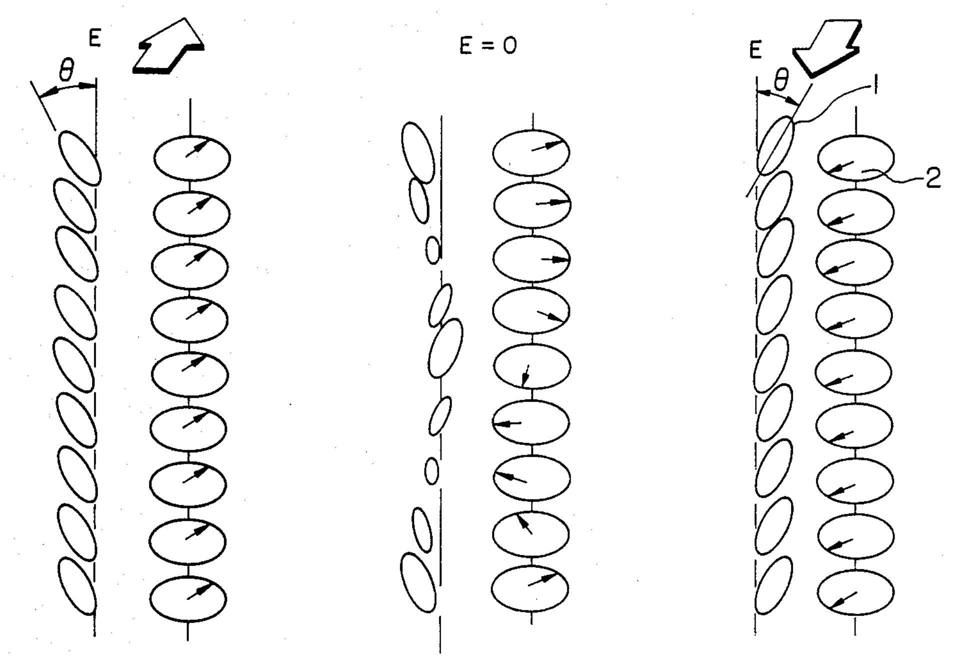
FIGS. 2*a*, 2*b*, 2*c* and 38*a* and 38*b* show the orientation of liquid crystal molecules.
Figure 3:
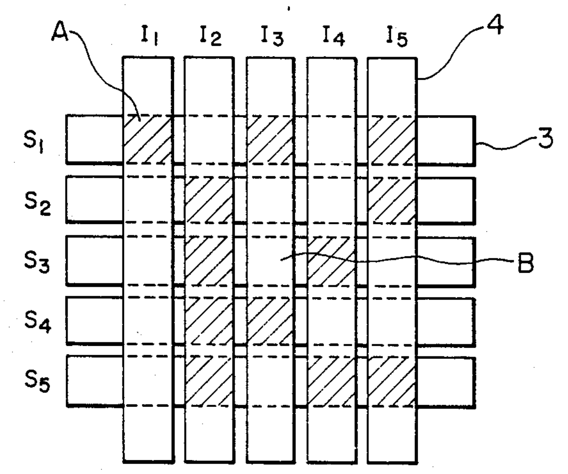
Figure 4:
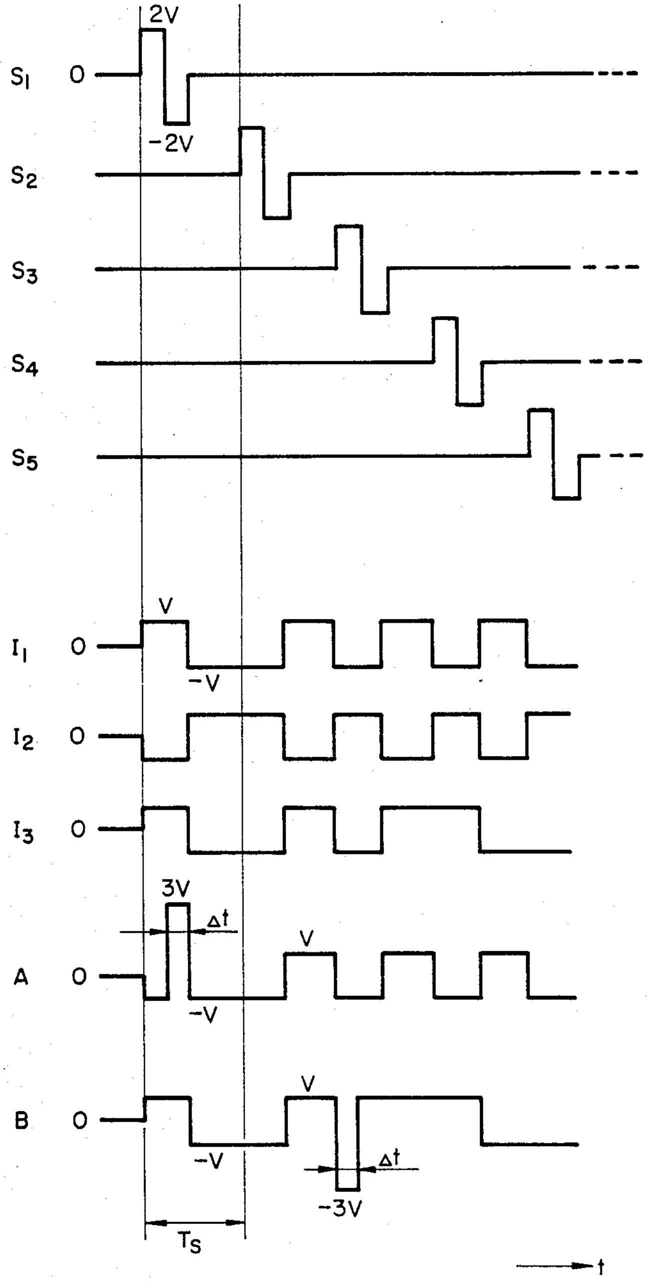

Next, matrix driving dealt with in the present invention will be briefly described with reference to FIG. 1. FIG. 1(*a*) shows schematically a matrix panel. The points of intersection between signal electrodes 12 and scanning electrodes 13 form pixels 14.

The voltage waveform applied to the liquid crystal pixels by the signal voltages $V_{Y1}$, $V_{Y2}$, $V_{Y3}$ to the signal electrodes 1, 2, 3 and the scanning voltages $V_{X1}$, $V_{X2}$, $V_{X3}$ to the scanning electrodes 1, 2, 3 will be described with reference to the pixel $P_{22}$ by way of example.

FIG. 1(*b*) shows schematically the voltage waveform applied to the pixel $P_{22}$. The application timing of the voltage consists of five periods, i.e., the initialization period $T_{IN}$ of all the pixels, the non-selection periods $T_{NS1}$, $T_{NS2}$, the selection period $T_{SL}$ and the stop period $T_{ST}$. Incidentally, the stop period $T_{ST}$ may be omitted.

The initialization period $T_{IN}$ determines the display state of the liquid crystal to the display ON state or the display OFF state. The waveform A represents the case where the liquid crystal is set to the display OFF state in the initialization period while the waveform B represents the case where it is set to the display ON state.

The operation described above is effected for all the pixels, but may be effected for at least those pixels (in a line unit) whose display content needs be re-written. In either case, the initialization voltage $\pm V_{IN}$ is applied altogether to the pixels as the object of initialization.

After the initialization operation described above is complete, voltages which bring the liquid crystal to the display ON state or display OFF state are applied to the pixels by line sequence scanning in the selection period $T_{SL}$.

When, for example, the liquid crystal is set to the display OFF state in the initialization period $T_{IN}$ as represented by the waveform A, the voltages to be applied to the pixels in the selection period $T_{SL}$ are a write voltage above $V_{w\,sat(ON)}$ for turning on the pixels and a voltage below $V_{bth(ON)}$ for keeping the OFF state, on the contrary.

When the liquid crystal is set to the display ON state in the initialization period $T_{IN}$ as represented by the waveform B, the voltages to be applied in the selection period $T_{SL}$ are a voltage below $V_{w\,sat(OFF)}$ for turning off the pixels and a voltage below $V_{bth(OFF)}$ for keeping the ON state, on the contrary.

Furthermore, the voltage to be applied to the liquid crystal in the stop period $T_{ST}$ is $V_{bth(ON)}$ or a voltage below $V_{bth(OFF)}$, or no voltage at all is applied to both the scanning electrodes and the signal electrodes. This state can be attained by bringing the output of the driving circuit to a high impedance.

As described above, one of the characterizing features of the present invention lies in that the voltage for determining the display state of the liquid crystal is applied in the initialization period $T_{IN}$, and the voltage keeping the display state described above or the voltage inversing the display state is applied in the selection period $T_{SL}$.

In connection with the display characteristics of the liquid crystal that have so far been described, the display state is defined as the "display ON state" by the positive polarity and as the "display OFF state" by the negative polarity, but this definition is merely for convenience's sake. In other words, the display is in the OFF state at the positive polarity and ON state at the negative polarity if setting of the polarizer is reversed, for example.

Next, a definite example of the voltage waveforms applied to the liquid crystal panel will be described with reference to the liquid crystal panel shown in FIG. 11. The impressed voltages to the signal electrodes 15*a*~15*c* are defined as the signal voltages $V_{Y1} \sim V_{Y3}$ and the impressed voltages to the scanning electrodes 16*a*~16*c*, as the scanning voltages $V_{X1} \sim V_{X3}$. FIG. 12 shows the relation between the polarities of the scanning voltage $V_X$ ($V_{X1} \sim V_{X3}$), the signal voltage $V_Y$ ($V_{Y1} \sim V_{Y3}$) and the brightness of the pixel 7. The display state is hereby assumed to be ON and OFF when the polarities of the voltage applied to the pixels are positive a negative, respectively.

Figure 13:
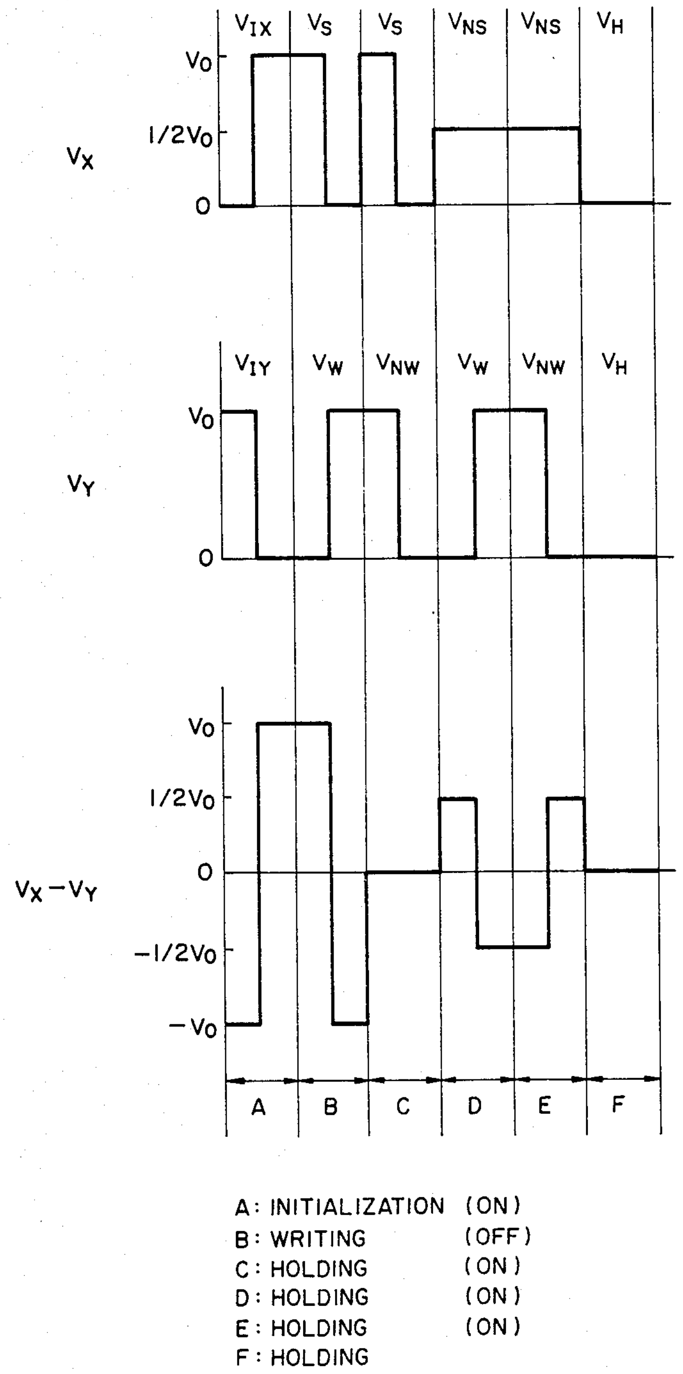

FIG. 13 shows one example of the scanning voltage $V_X$, the signal voltage $V_Y$ and the voltage applied to the pixel.

$V_{IX}$ of the scanning voltage and $V_{IY}$ of the signal voltage are the voltages for initializing the brightness of the pixel. They will be hereinafter referred to as the "initialization voltage". Symbol $V_s$ represents a selection voltage which is applied to a selected scanning electrode, and symbol $V_{NS}$, represents a non-selection voltage which is applied to a non-selected pixel. Furthermore, symbol $V_H$ represents a holding voltage which is applied to the scanning and signal electrodes after re-write of the picture surface.

On the other hand, $V_w$ is applied to the signal electrode in order to inverse the brightess of the pixels that have been initialized by the write voltage, and $V_{NW}$ is applied to the signal electrodes in order to hold the brightness of the pixels that have been initialized by the non-write voltage.

In this example of the driving waveform, particularly in the scanning voltage $V_X$, the peak value of the nonselection voltage $V_{NS}$ is set to $\frac{1}{2}$ of the selection voltage $V_S$. Incidentally, the holding voltage $V_H$ may be omitted.

As a result, the voltage $V_X - V_Y$ applied to the pixels consists of each of the portions of the initialization period A, the write period B, the holding periods C, D, E F. Since the pixels are turned ON in the initialization period A, the liquid crystal is reversed to the OFF state in the write period B. In the holding periods of C. D, E and F, the pixels hold the ON state.

Figure 14:
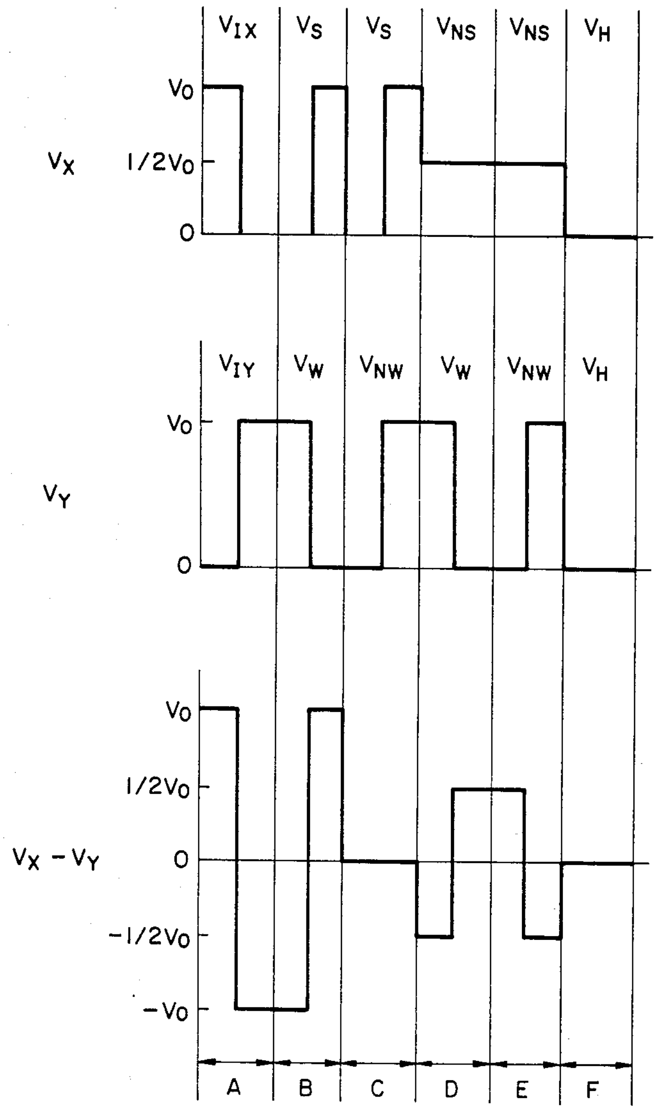

FIG. 14 shows an example of the driving waveform in order to bring the brightness into the OFF state since the brightness in the initialization stage in FIG. 13 is ON. In comparison with the waveforms shown in FIG. 13, the phases of the initialization voltages as $V_{IX}$ and $V_S$ of the scanning voltage $V_X$, the phase of the initialization voltage $V_{IY}$ of the signal voltage $V_Y$ and the phases of the write voltage $V_w$ and non-write voltage $V_{NW}$ are opposite to those in FIG. 13.

As a result, the pixels are in OFF state in the initialization period A and in the ON state in the write period. Furthermore, the pixels hold the OFF state in the holding periods of C, D, E and F.

Figure 15:
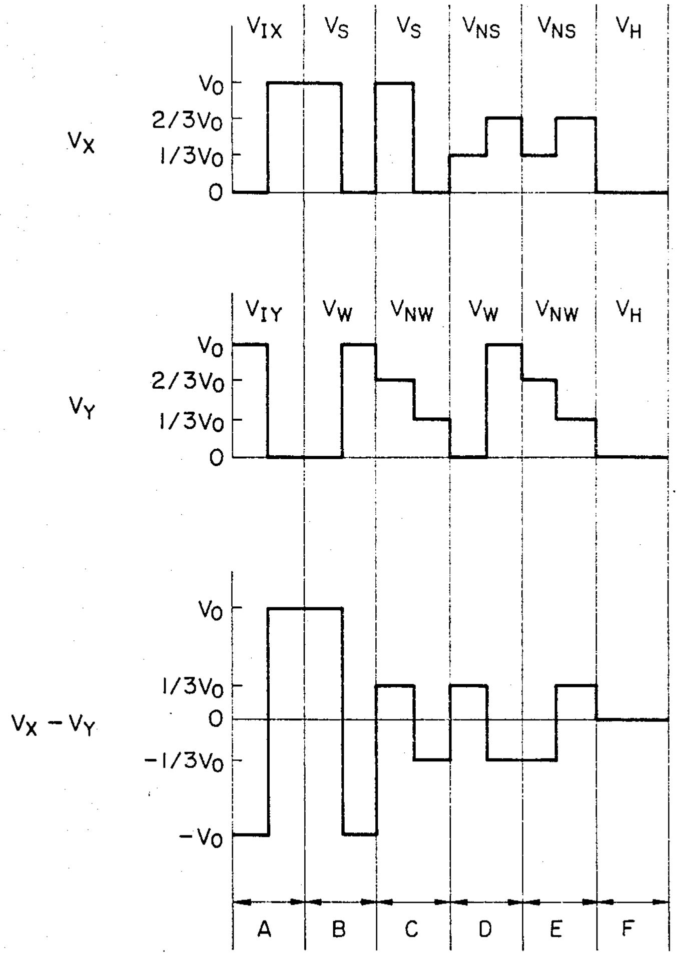
Figure 16:
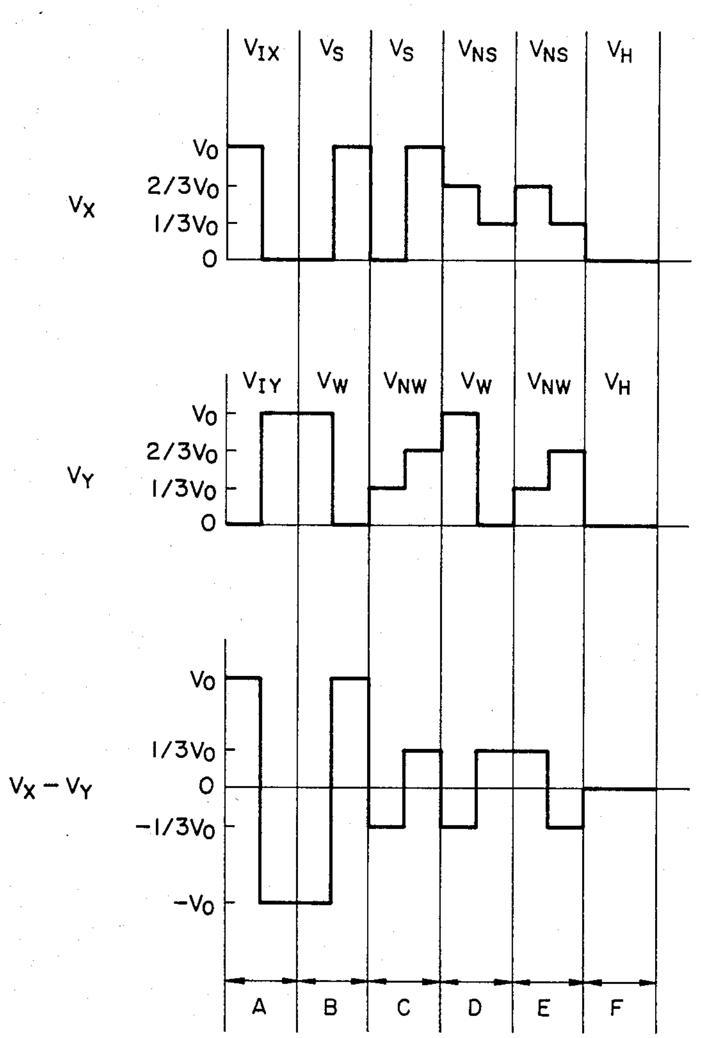

FIGS. 15 and 16 show other driving waveforms. FIG. 15 shows the waveform for bringing the brightness into the ON state when the pixels are initialized and FIG. 16 shows the OFF state, on the contrary.

Figure 17:
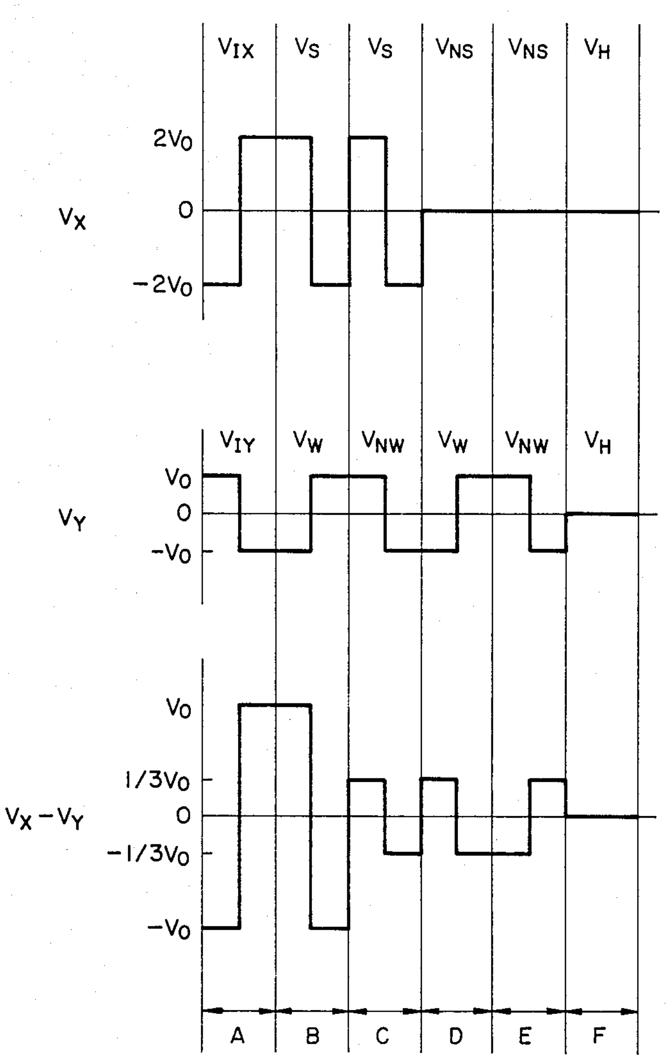
Figure 18:
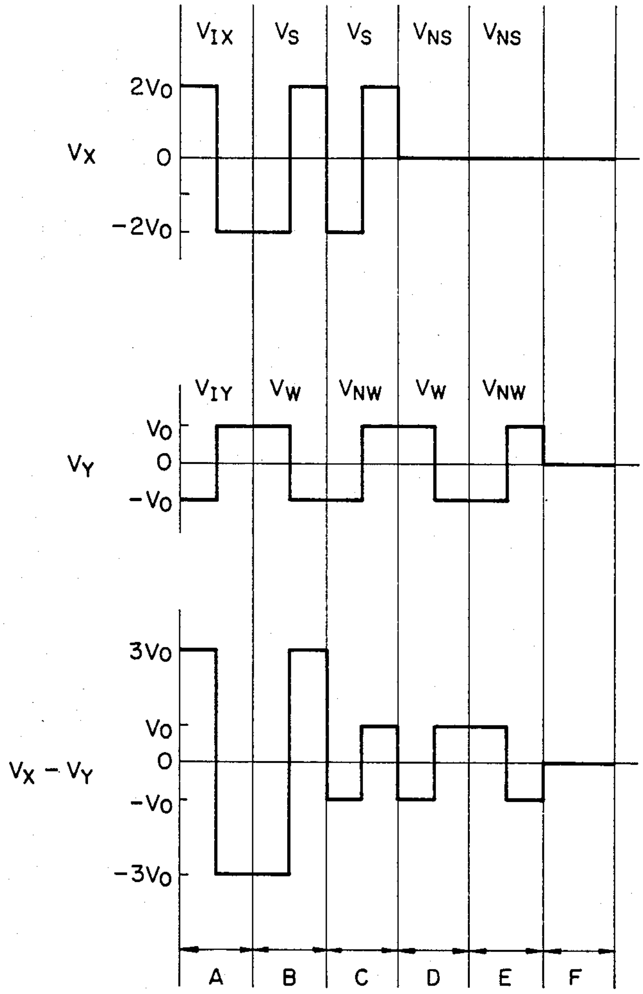

FIGS. 17 and 18 show other drivng waveforms. FIG. 17 shows the waveform for bringing the brightness into the ON state in the initialization period and FIG. 18 shows the waveform for the OFF state.

Figure 19:
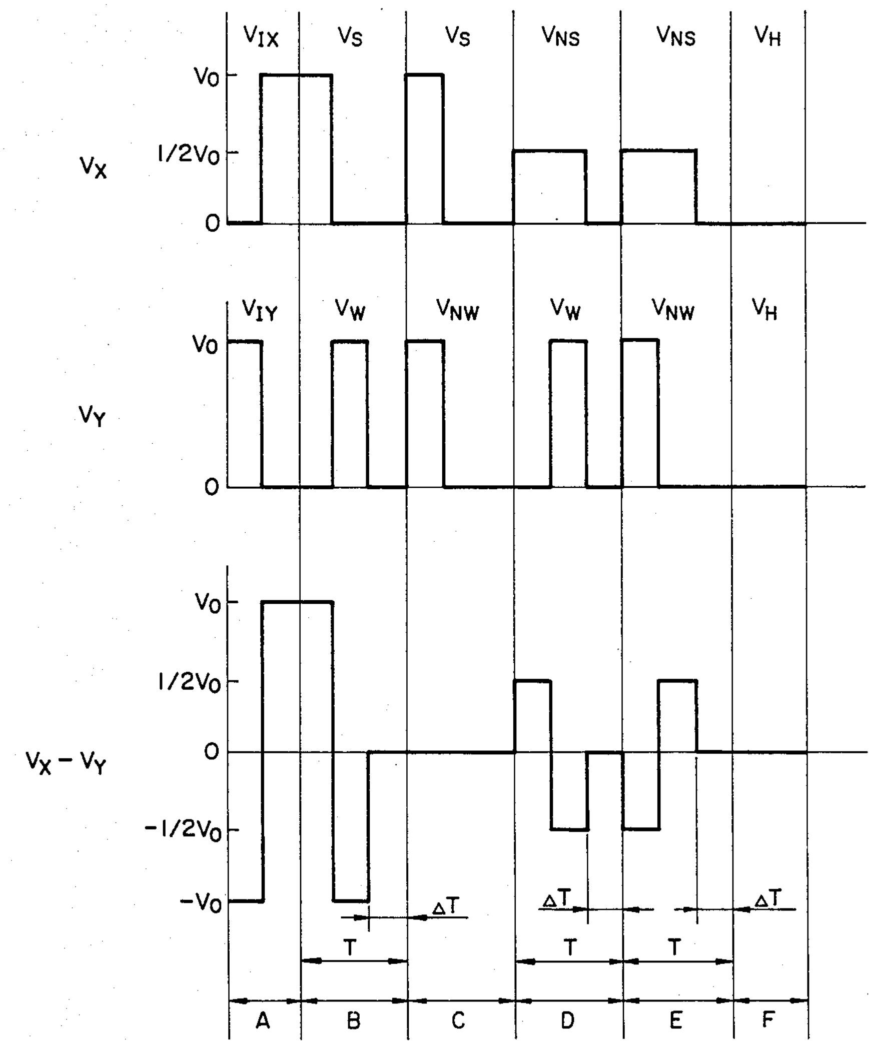
Figure 20:
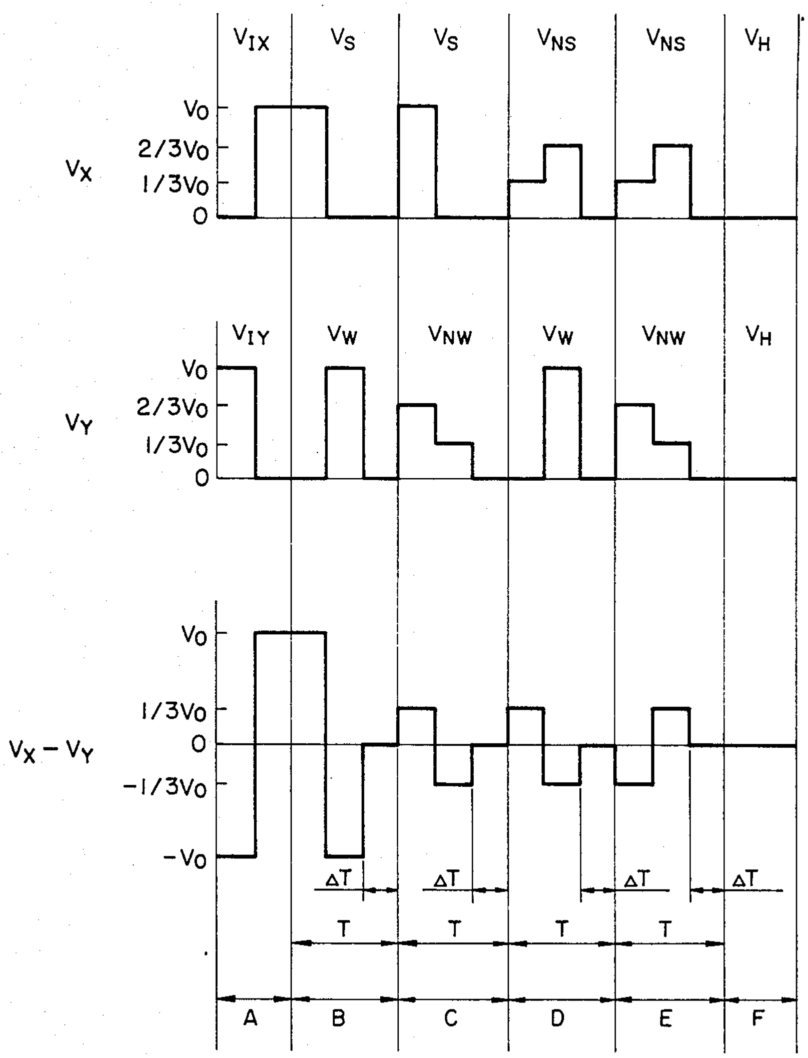
Figure 21:
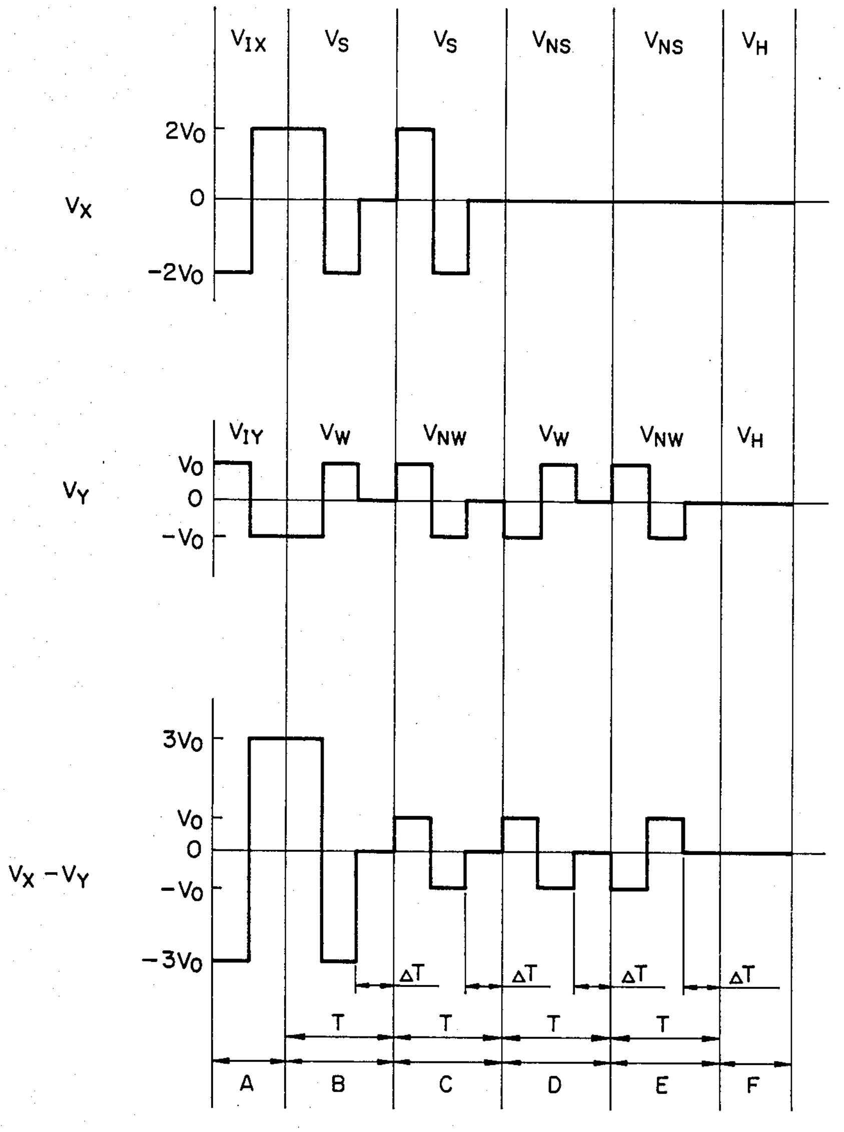

FIGS. 19, 20 and 21 show the modified waveforms of the waveforms shown in FIGS. 13, 15 and 17, respectively.

The characterizing feature of the driving waveform shown in FIG. 19 lies in that the period $\Delta T$, in which the voltage is 0 V, is provided in the selection voltage $V_S$ and the non-selection voltage $V_{NS}$ and the write voltage $V_W$ and the non-write voltage $V_{NW}$.

Accordingly, the voltage $V_X - V_Y$ applied to the pixel becomes 0 V for only the time $\Delta T$ in the write period B and the holding periods C, D and E.

This is based on the experimental result that if the pulse width is narrowed when the amplitude value of the voltage of the voltage waveform applied to the liquid crystal particularly in the holding period (non-selection period) is made constant, the optical threshold voltages $V_{bth(ON)}$ and $V_{bth(OFF)}$ of the liquid crystal rise, the rise becomes sharp and the characteristic can be improved.

FIGS. 20 and 21 show other driving waveforms based on the same concept as that of the driving method shown in FIG. 19.

Incidentally, the same driving method can be used for the modified embodiments shown in FIGS. 14, 16 and 18, though the detail is omitted.

The 0 V period may be disposed in the initialization period in the embodiments shown in FIGS. 19, 20 and 21.

Figure 11:
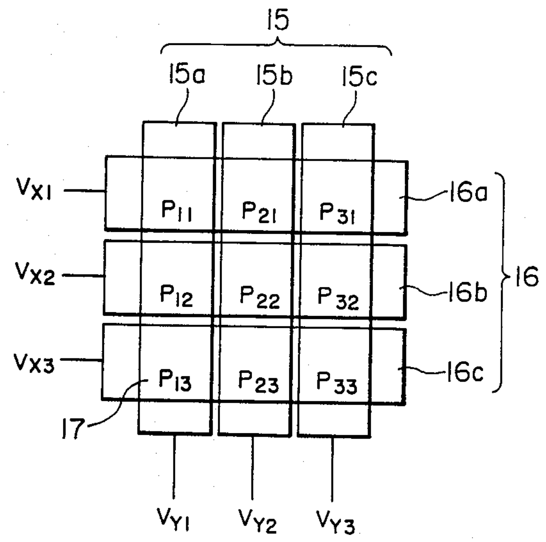
FIGS. 11 through 23, 29 through 33 and 45 through 47 show the driving waveforms in the present invention.
Figure 12:
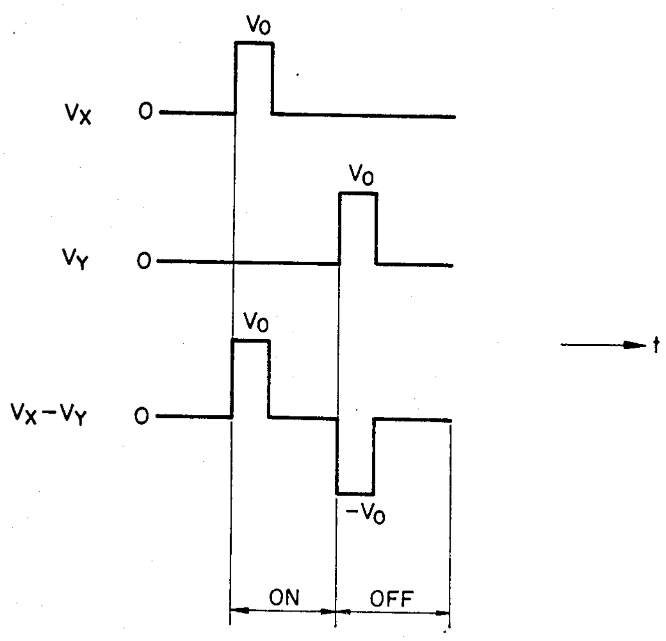
Figure 22:
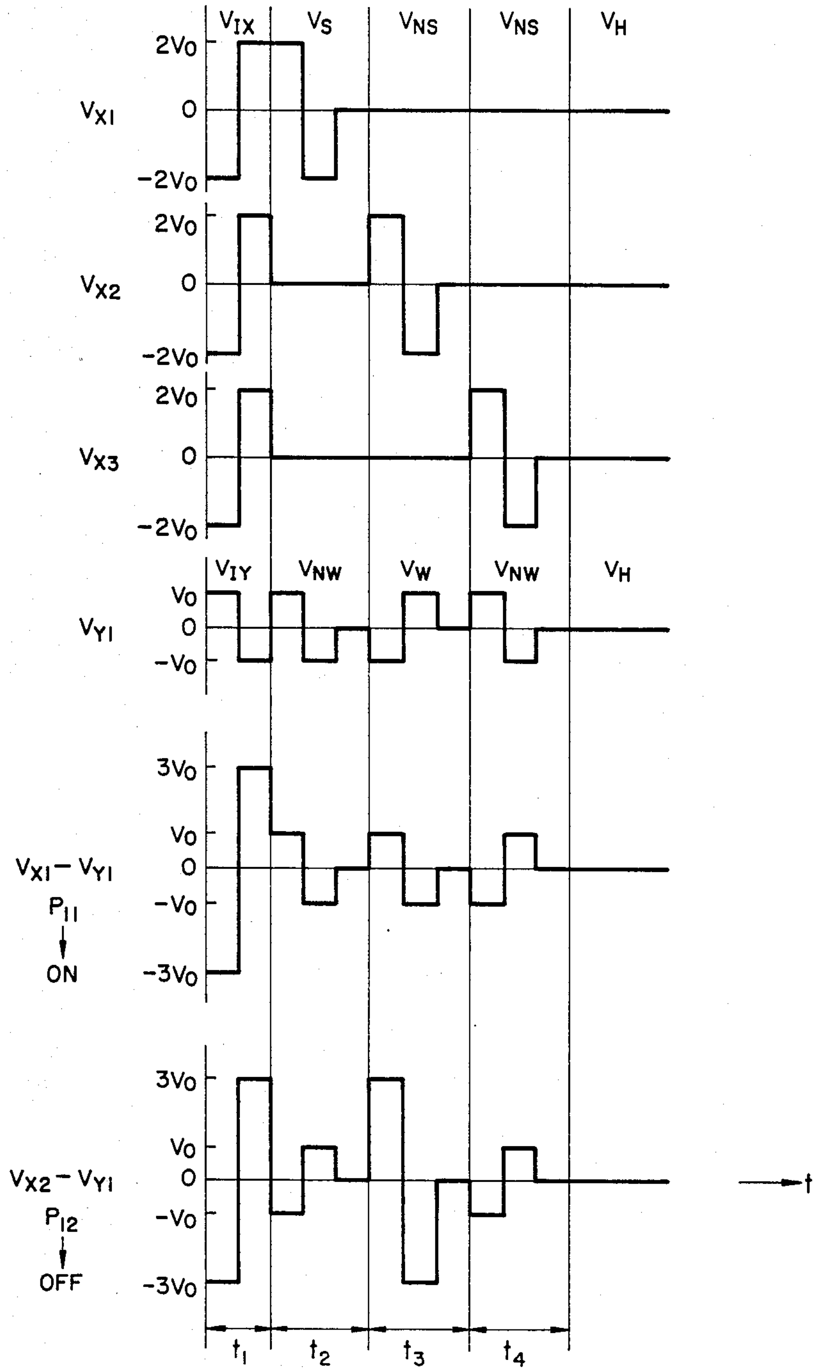
Figure 23:
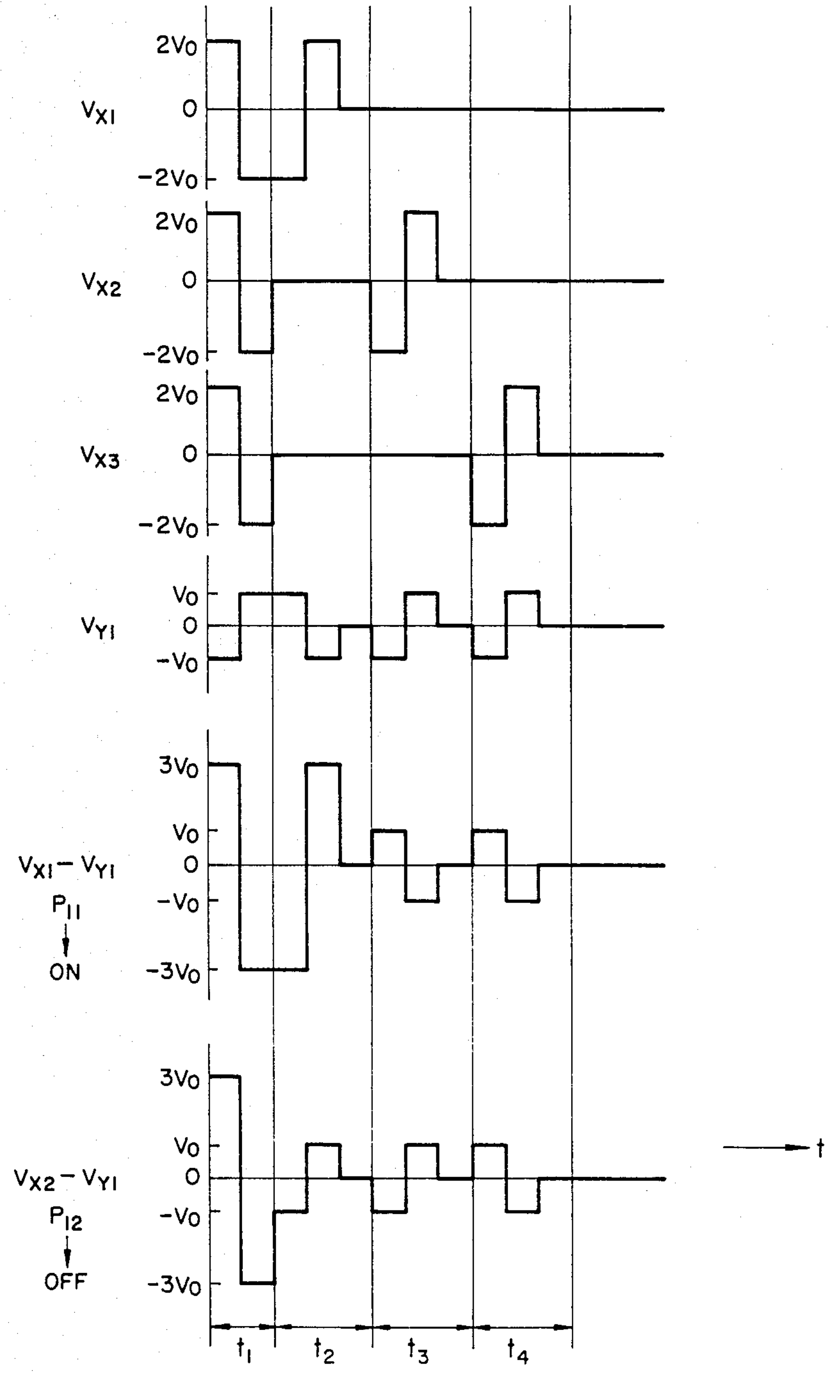

Next, the voltage waveforms applied to the scanning electrodes and the signal electrodes when the pixel $P_{11}$ is turned ON and the pixels $P_{12}$ and $P_{13}$ are turned OFF in the liquid crystal panel shown in FIG. 11, and the voltage waveforms applied to the pixels, are shown in FIGS. 22 and 23.

The waveforms shown in FIGS. 22 and 23 are based on the voltage waveforms shown in FIGS. 17 and 18.

The $t_1$ time is the initialization time for initializing all the pixels. Therefore, $V_{X1} \sim V_{X3}$ are set to the initialization voltage $V_{IX}$ and $V_{Y1} \sim V_{Y3}$ are set to the initialization voltage $V_{IY}$. Therefore, $\pm 3\ V_0$ voltage is applied to the liquid crystal and eventually, the liquid crystal is turned ON.

Next, the selection voltage $V_S$ is sequentially applied to each scanning electrode in the $t_2$, $t_3$ and $t_4$ periods. At this time, the non-write voltage $V_{NW}$ is applied to the signal electrodes in order to turn ON the pixels as $P_{11}$, so that the pixels hold the initial state before the start of scanning.

On the other hand, the write voltage $V_W$ is applied in order to turn OFF the pixels as $P_{12}$, so that the display state of the pixels is inversed to the OFF state.

Re-write of one picture surface is completed by the operations described above. After completion, the $V_H$ voltage is applied to the scanning electrodes and the signal electrodes, but a voltage that does not inverse the initial state may be applied. For example, the scanning voltage is set to the non-selection voltage $V_{NS}$ while the signal voltage is set to $V_{NW}$.

FIG. 23 shows an example of the voltage waveforms when the initial state is set to the OFF state.

Figure 24:
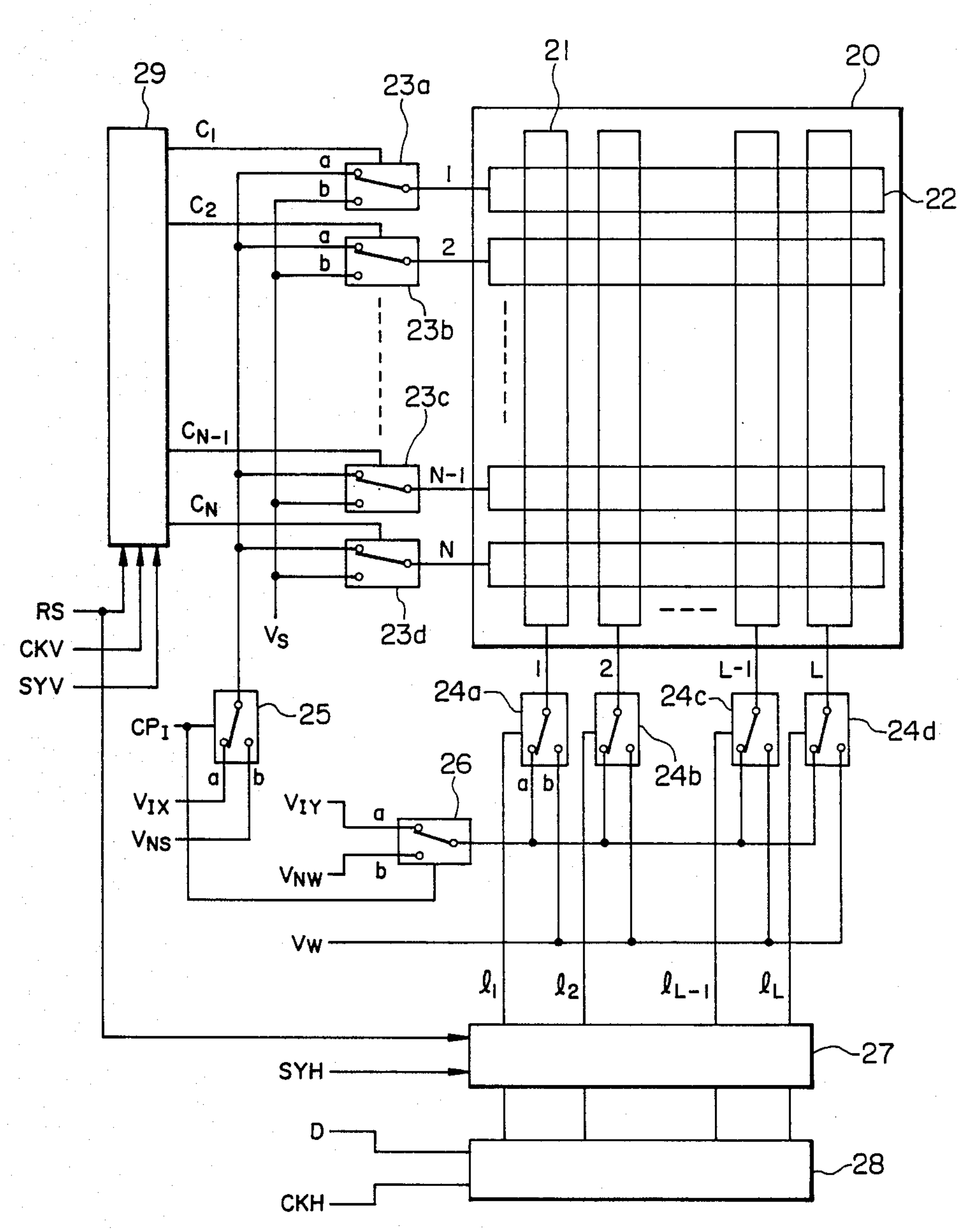
FIGS. 24 and 34 show definite examples of a driving circuit.

FIG. 24 shows an example of the driving circuits. Reference numerals 23*a* ~23*d* and 24*a*~24*d* represent analog switches; 25 and 26 are switches; 29 is a scanning circuit;

Lgister; 20 is a liquid 27 is a line memory; 28 is a shift r crystal panel; 21 is a signal electrode; and 22 is a scanning electrode.

The analog switches 23*a*~23*d* select an a input when the scanning signals $C_1 \sim C_N$ are "L" and a b input when the latter are "H". The analog switches $\mathbf{24}_a$~24*d* select the a input when the display signals $l_I \sim l_L$ are "L" and the b input when the latter are "H". The 25, 26 select the a input when a driving change-over signal $CP_I$ is "H" and the b input when the latter is "L".

Figure 25:
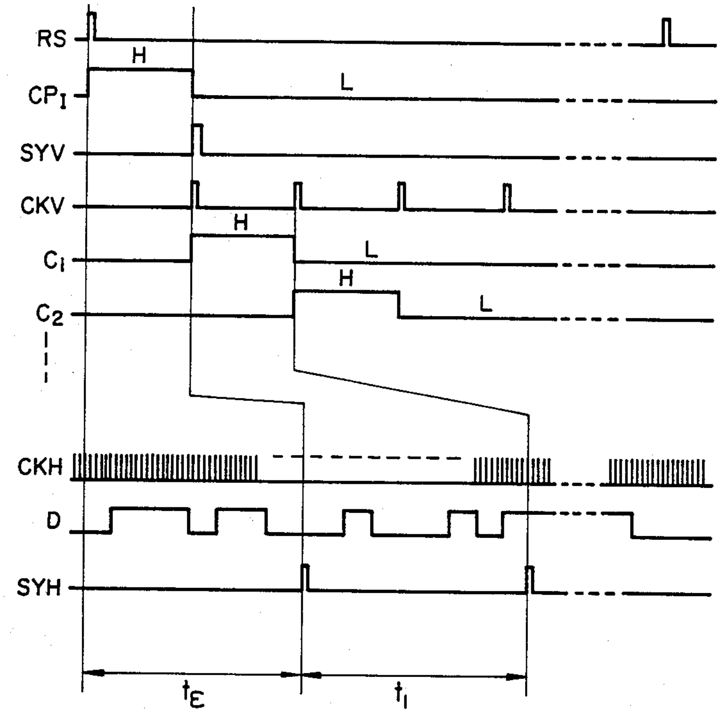
FIGS. 25 and 35 show the timing charts of FIGS. 24 and 34, respectively.

The operation of this circuit is shown in FIG. 25. The scanning circuit 29 and the line memory are reset by the reset signal RS to set the scanning signals $C_I \sim C_N$ and the display signals $l_I \sim l_{L-1}$ to the "L" level. Further, the driving change-over signal $CP_I$ is set to "H" in the $t_E$ period. As a result, the outputs of the analog switches 23~23*d* become the initialization voltage $V_{IX}$ while the outputs of the analog switches 24*a*~24*d* become the initialization voltage $V_{IY}$. Accordingly, all the pixels are brought into the initial state.

After the operation described above is complete, the output of the shift register 28 is taken into the line memory 27 at the timing of the sync signal SYH. The pixels of the first line are turned ON or OFF in the $t_1$ period and this operation is thereafter repeated till the Nth line. At this time, the switches 25, 26 select $V_{NS}$ and $V_{NW}$, respectively.

After re-write of all the picture surfaces is complete, the scanning circuit 29 and the line memory 27 are reset by the reset signal RS and the scannng signals $C_I \sim C_N$ and the display signals $l_I \sim l_L$ are set to "L". Accordingly, the non-selection voltage $V_{NS}$ is appied to all the scanning electrodes while the non-write voltage $V_{NW}$ is applied to all the signal electrodes, thereby holding the display state.

Figure 26:
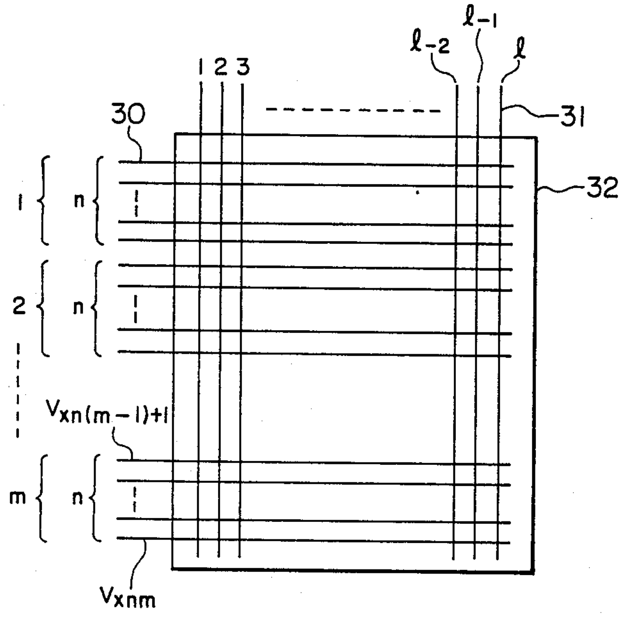
FIGS. 26 and 27 show application examples of the present invention.
Figure 27:
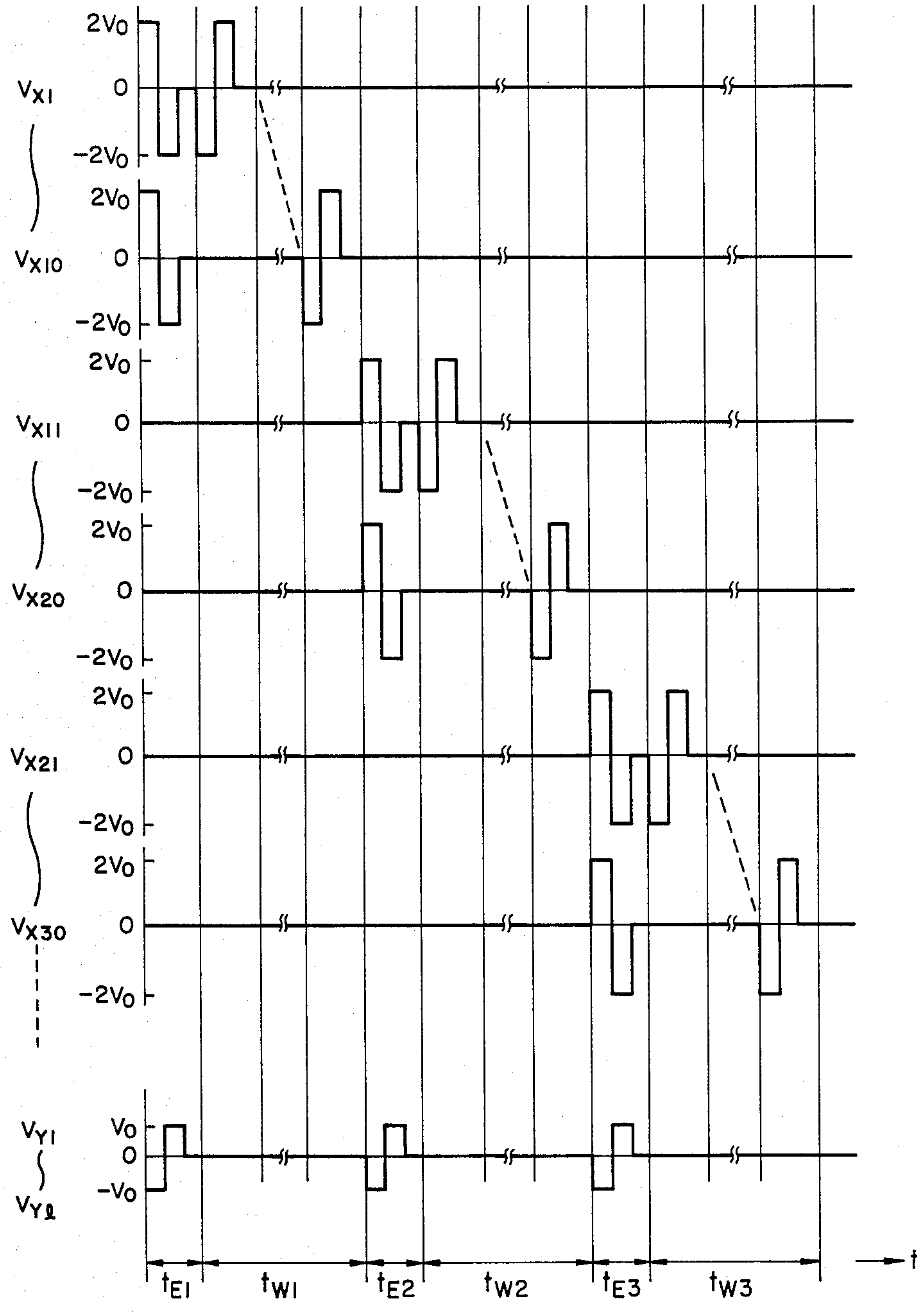

An application example of the present invention will be described with reference to FIGS. 26 and 27. FIG. 26 shows the outline of an m-row l-column liquid crystal panel 32. A driving method of this liquid crystal panel, where the scanning electrodes are divided into m blocks and each block has n columns, will be described.

Driving is made while the initialzation operation and the write operation are effectedas a pair for each of the blocks. The outline of this driving method will be described with reference to FIG. 27.

The driving waveform shown in the drawing is based on the voltage state diagram shown in FIG. 23 where the number of columns of one block is n=10. However, the 0 V period is provided in the initialization voltages $V_{IX}$ and $V_{IY}$.

A $t_{E1}$ period is the period in which all the pixels contained in the block 1 are initialized (turned OFF), and the write operation into the block 1 is then made by line sequential scanning in a subsequent $t_{w2}$ period The operation described above is effected sequentially for the blocks 2, 3, . . . and so forth and all the picture surfaces are re-written.

The re-write operation of the picture surface may be effected either in a predetermined period, or only when the display content is changed. In the latter case, only the block(s) for which the change is necessary may be selected.

Figure 28A:
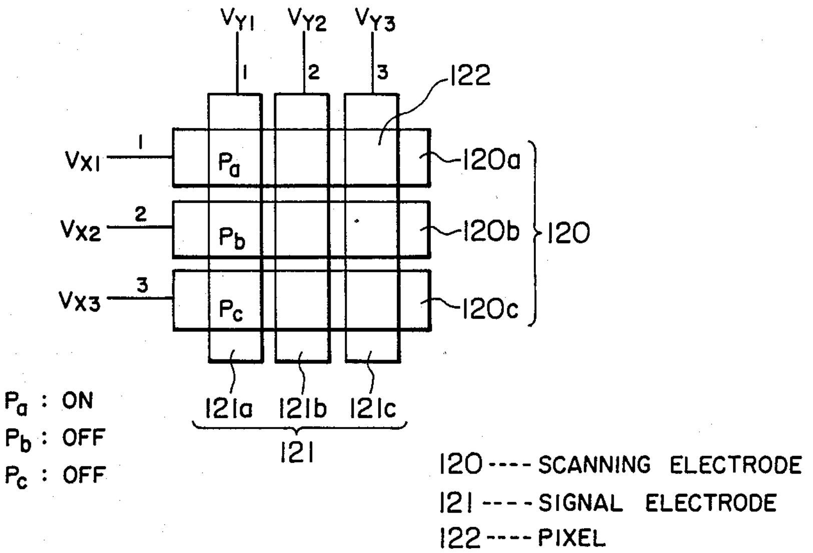
Figure 28B:
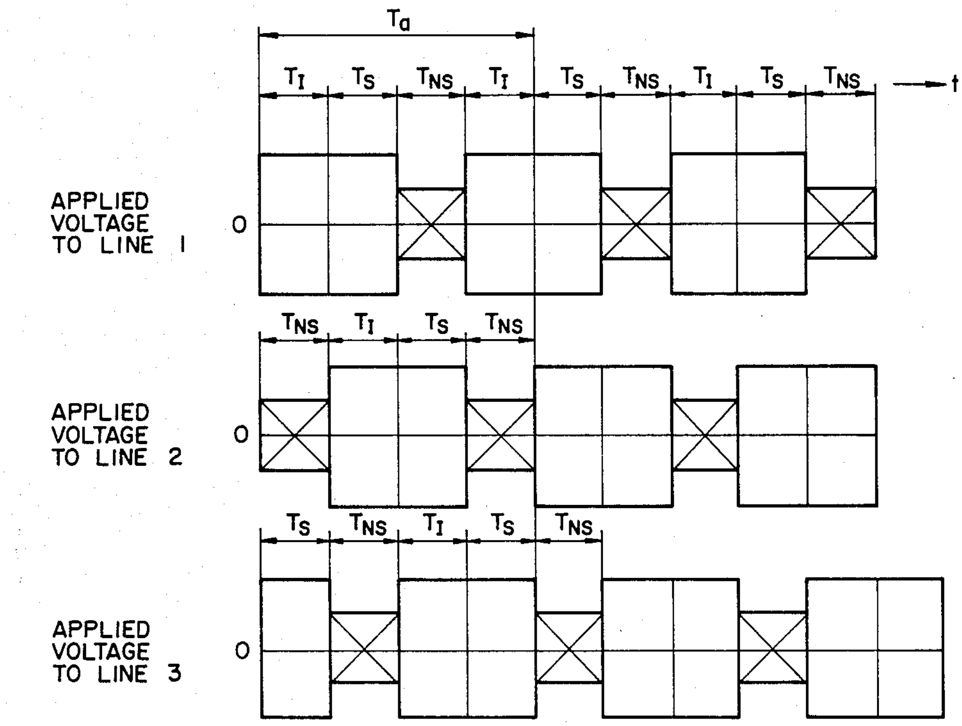

Next, matrix driving dealt within the present invention is schematically shown in FIG. 28. FIG. 28(*a*) shows the outline of the matrix panel. Reference numerals 120*a*~120*c* represent scanning electrodes, 121*a*~121*c* are signal electrodes and 122 is a pixel.

Each of the pixels operates by the difference voltage between the impressed voltages $V_{X1} \sim V_{X3}$ to the scanning electrodes 120*a*~120*c* and the impressed voltages $V_{Y1} \sim V_{Y3}$ to the signal electrode 121*a*~121*c*.

FIG. 28(*b*) shows the voltage wa eform applied to each pixel for each line of the lines 1 to 3. The write operation is made in the sequence of from line 1 to line 3 in the longitudinal direction.

First of all, the pixels of the line 1 are set to the display OFF or display ON state by first driving (in the period $T_1$) Next, a voltage for holding the initial state or a voltage for inversing the initial state is applied to the pixels of the line 1 by second driving (in the period $T_s$). While the pixels of the line 1 are being driven by second driving, the pixels of the line 2 are set to either the display OFF state or the display ON state by first driving. Next, a voltage for holding the initial state or a voltage for inversing the initial state is applied to the pixels of the line 2 by second driving. The pixels of the line 3 are driven by the same driving method as described above.

This write operation may be effected in predetermined period. Alternatively, after one picture surface is re-written, the scanning voltage $V_{X1} \sim V_{X3}$ and the signal voltage $V_{Y1} \sim V_{Y3}$ are all made to the same potential (inclusive of 0 V), or no voltage at all is applied.

Figure 29:
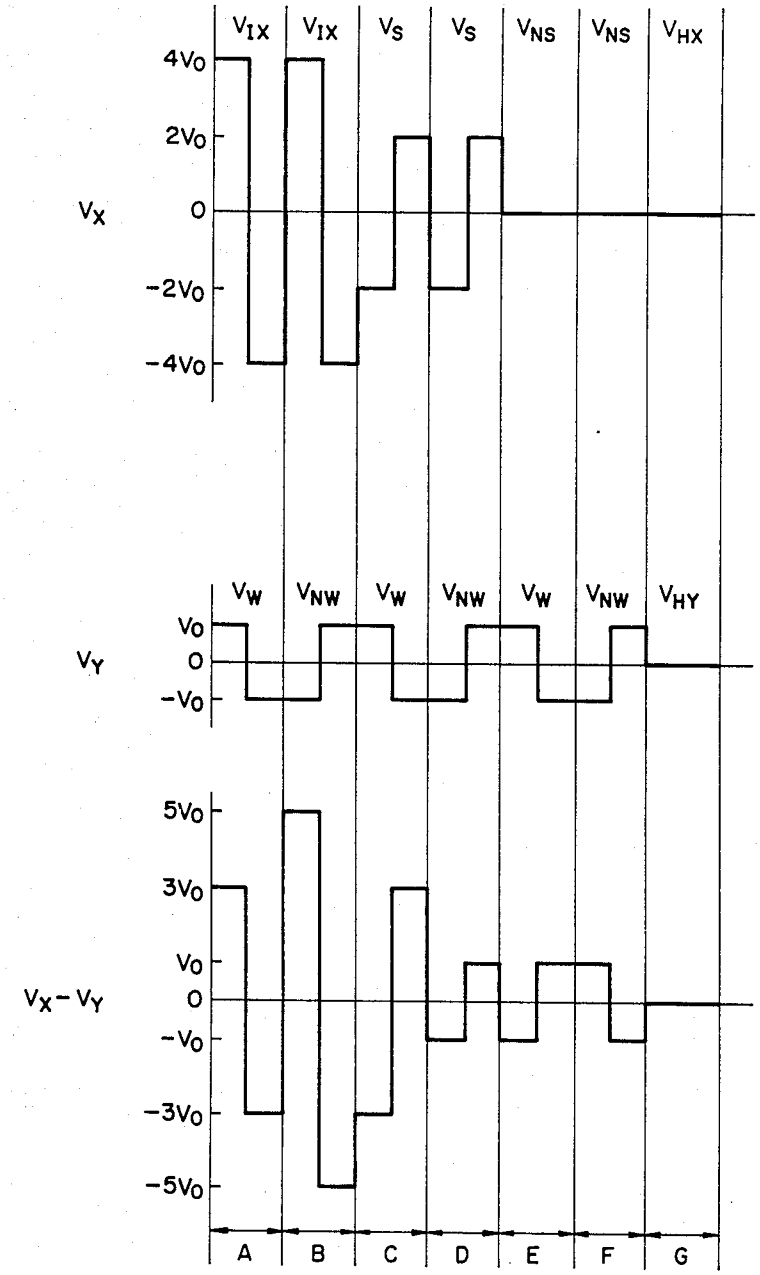

FIG. 29 shows an example of the driving waveforms. The scanning voltage $V_X$ consists of the initialization voltage of $\pm 4\ V_0$, the selection voltge of $\pm 2$ V, the non-selection voltage of 0 V and the holding voltage $V_{HX}$ of 0 V. However, the holding voltage $V_{HX}$ may be omitted.

On the other hand, the signal voltage $V_Y$ consists of the write voltage $V_W$ of $IV_0$, the non-write voltage $V_{NW}$ of $\pm V_0$ and the holding voltage $V_{HY}$. However, the holding voltage $V_{HY}$ may be omitted.

As a result, voltages A~G are applied to the liquid crystal. The waveforms A and B are the voltages that turn the display state of the liquid crystal to the display OFF state. In this case, the following relation must be satisfied in order to bring the liquid crystal to the display OFF state by the waveform A, too:

$$|3\ V_0 \geqq V_{wsat(OFF)}$$

The waveform C is the voltage that inverses the display OFF state brought forth by the waveforms A, B to the display ON state. Ouite naturally, the following relation is set:

$$|3\ V_0 \geqq V_{wsat(ON)}$$

The waveforms D, E and F are the holding voltages that hold the display OFF state of the pixels brought forth by the waveforms A and B, and the following relation must be satisfied:

$$|V_0 \leqq V_{hth(ON)}$$

Further, the waveform G is the holding voltage that holds the display state that is determined by the waveforms A, B or the waveform C.

The first driving shown in FIG. 28(*b*) is the waveforms A and B while the second driving is the waveform C.

Figure 30:
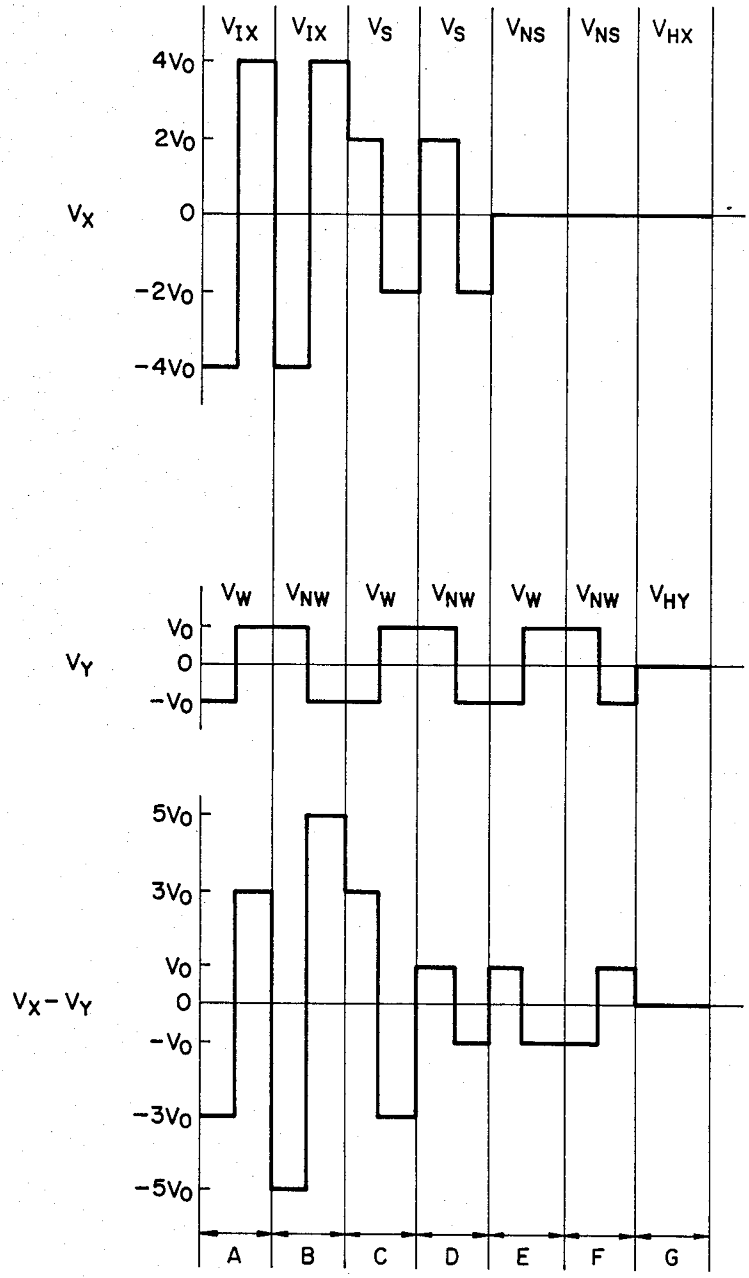

On the other hand, FIG. 30 shows the voltage state when the liquid crystal is set to the display ON state by the first driving. In this case, the following relation is to be satisfied:

$$|3V_0 V_{wsat(OFF)}, V_{wsat(ON)}$$

$$|V_0 \leqq V_{bth(OFF)}$$

Next, FIG. 28 shows an example of the scanning voltages $V_{X1} \sim V_{X3}$ and the signal voltages $V_{Y1} \sim V_{Y3}$ for setting the pixel Pa to the display ON state and the pixels $P_b$, $P_c$ to the display OFF state, and the voltages applied to the liquid crystal.

The voltage waveforms shown in the drawing are for turning the initial state to the display OFF state. Symbol $t_1$ is the initialization period of the line 1, $t_2$ is the selection period (write period) of the line 1 and the initialization period of the line 2, $t_3$ is the selection period of the line 2 and the initialization period of the line 3 and $t_4$ is the selection period of the line 3.

Figure 32:
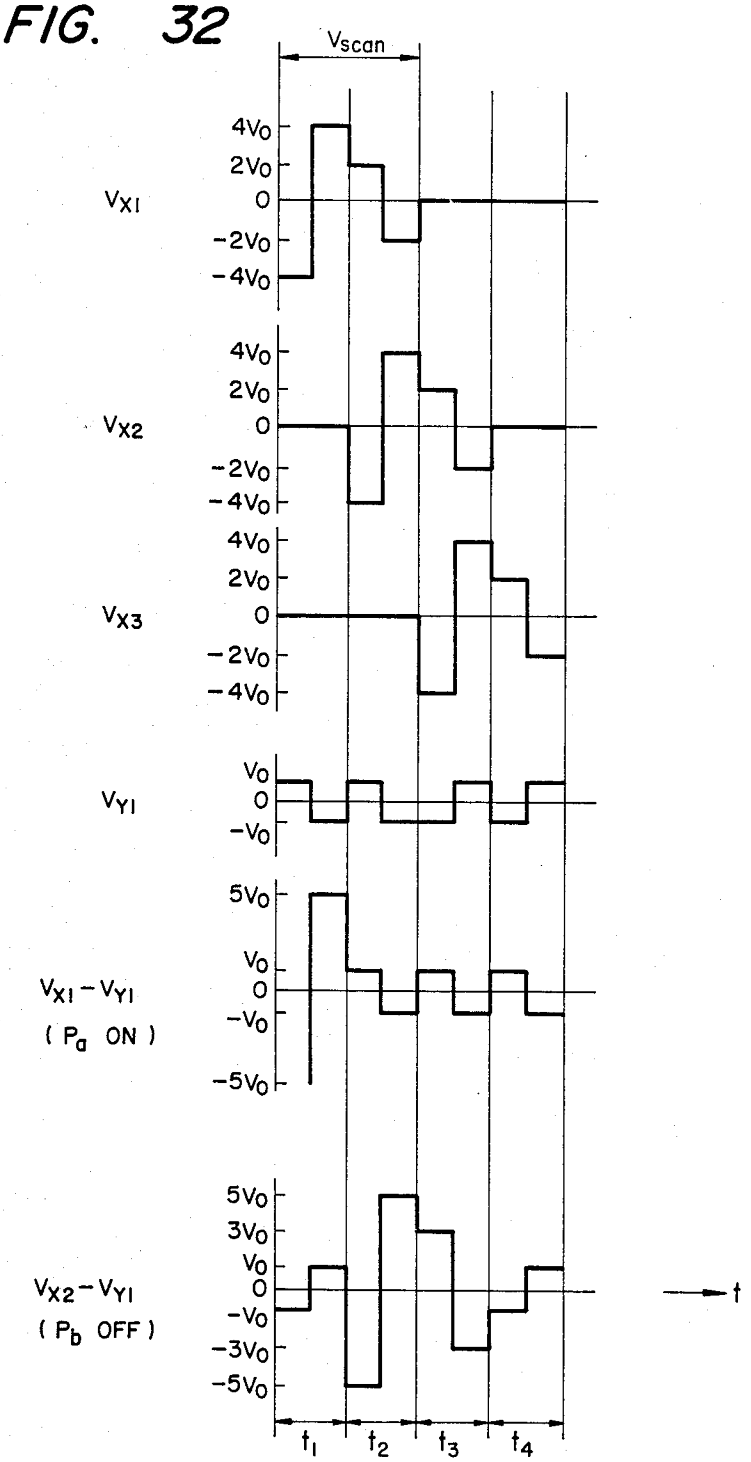

FIG. 32 shows an example of the voltage waveforms for turning the initial state to the display ON state.

Figure 31:
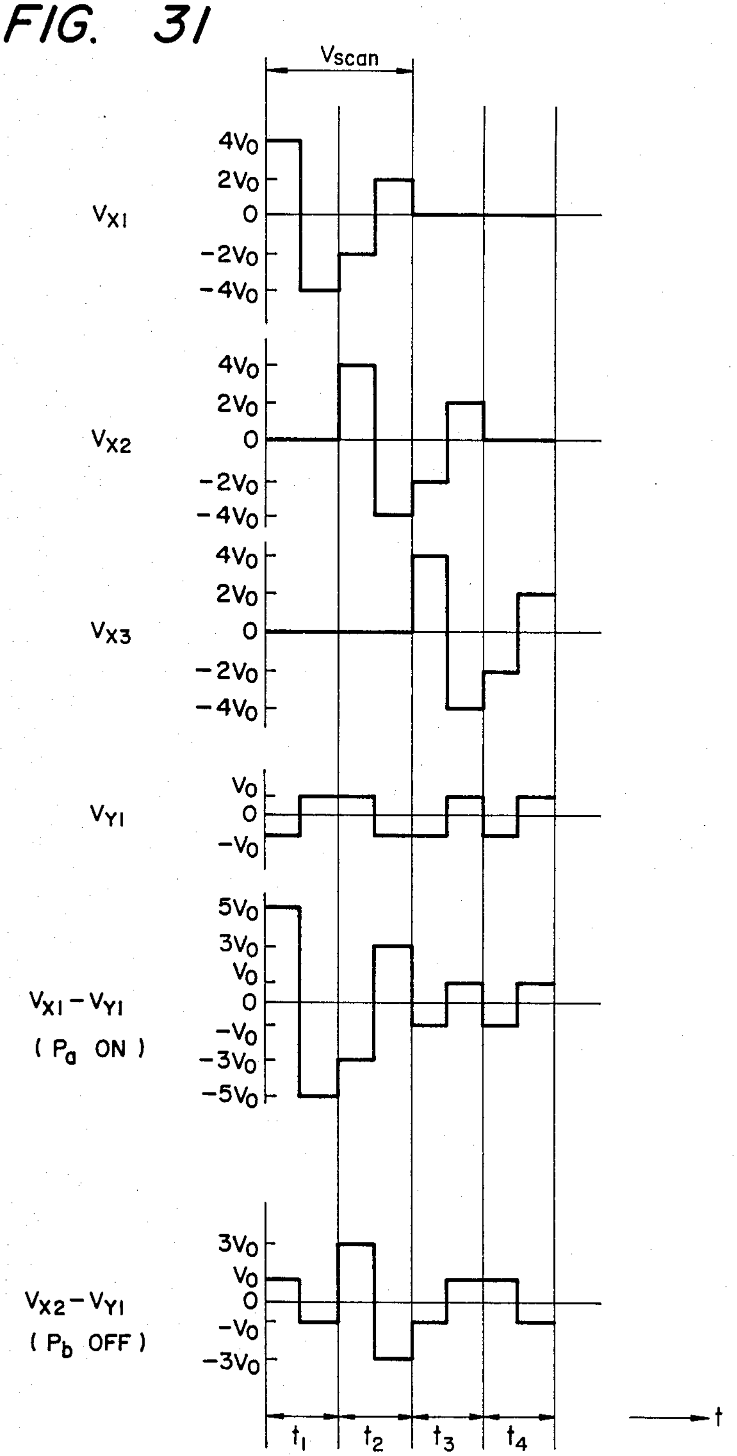
Figure 33:
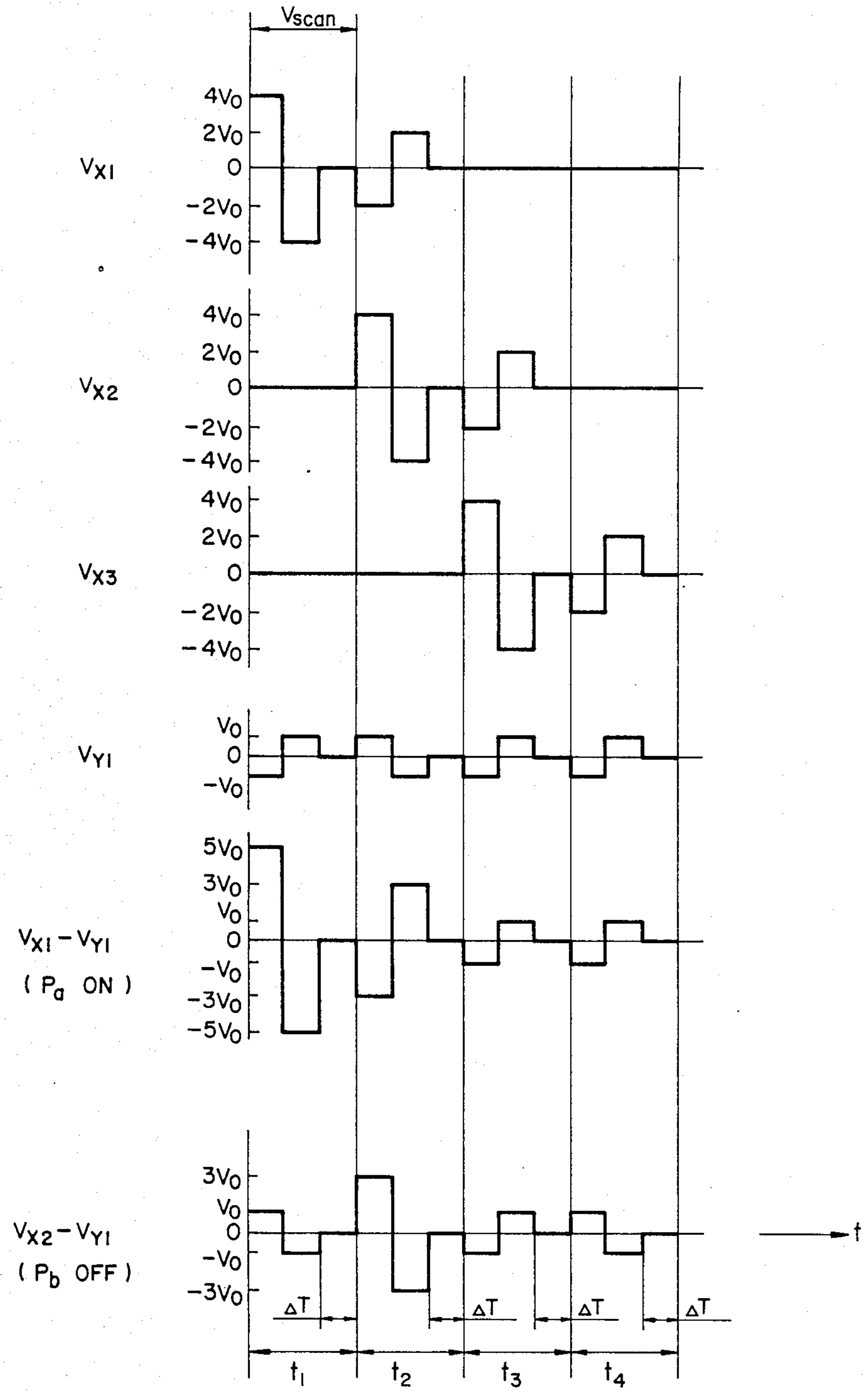

FIG. 33 shows a modified example of the voltage waveform shown in FIG. 31. This waveform is characterized in that a 0 V period is disposed for a time $\Delta t$ in the selection period. This driving method is effective particularly for preventing the response of the liquid crystal by the $\pm V_0$ voltage in the non-selection period. This driving method can be applied to the voltage waveform shown in FIG. 32.

Figure 34:
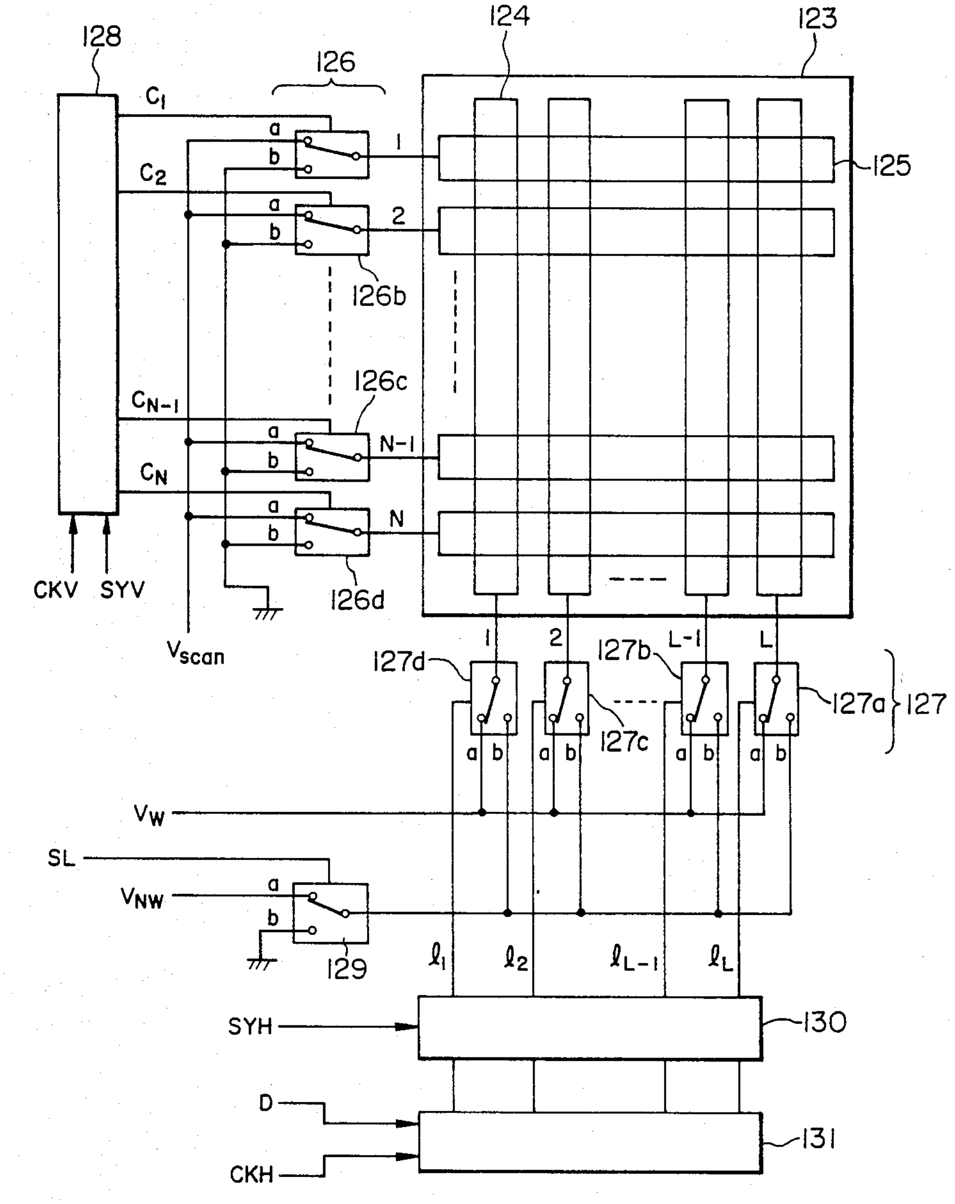

FIG. 34 shows an example of the driving circuit for accomplishing the driving method of the present invention. Reference numeral 123 represents a liquid crystal panel; 124 is a signal electrode; 125 is a scanning electrode; 126 and 127 are analog switches; 128 is a scanning circuit; 129 is a switch; 130 is a line memory; and 131 is a shift register.

The analog switch 126 selects an a input when the scanning signal $C_1 \sim C_N$ is "L" and a b input when the latter is "H". Further, the analog switch 127 selects the a input when the display signal $I_l \sim I_L$ is "L" and the b input when the latter is "H". The switch 129 selects the a input when the selection signal SL is "L" and the b input when the latter is "H".

The a input of the analog switch 127 is a $V_{scan}$ voltage shown in FIGS. 31 to 33. This voltage is generated by synthesizing the initialization voltage $V_{IX}$ and the selection voltage $V_S$ shown in FIGS. 31 and 30. The b input is set to 0 V.

On the other hand, the a input to the analog switch 127 is set to the write voltage $V_W$ and its b input, to the non-write voltage $V_{NW}$ or 0 V.

Figure 35:
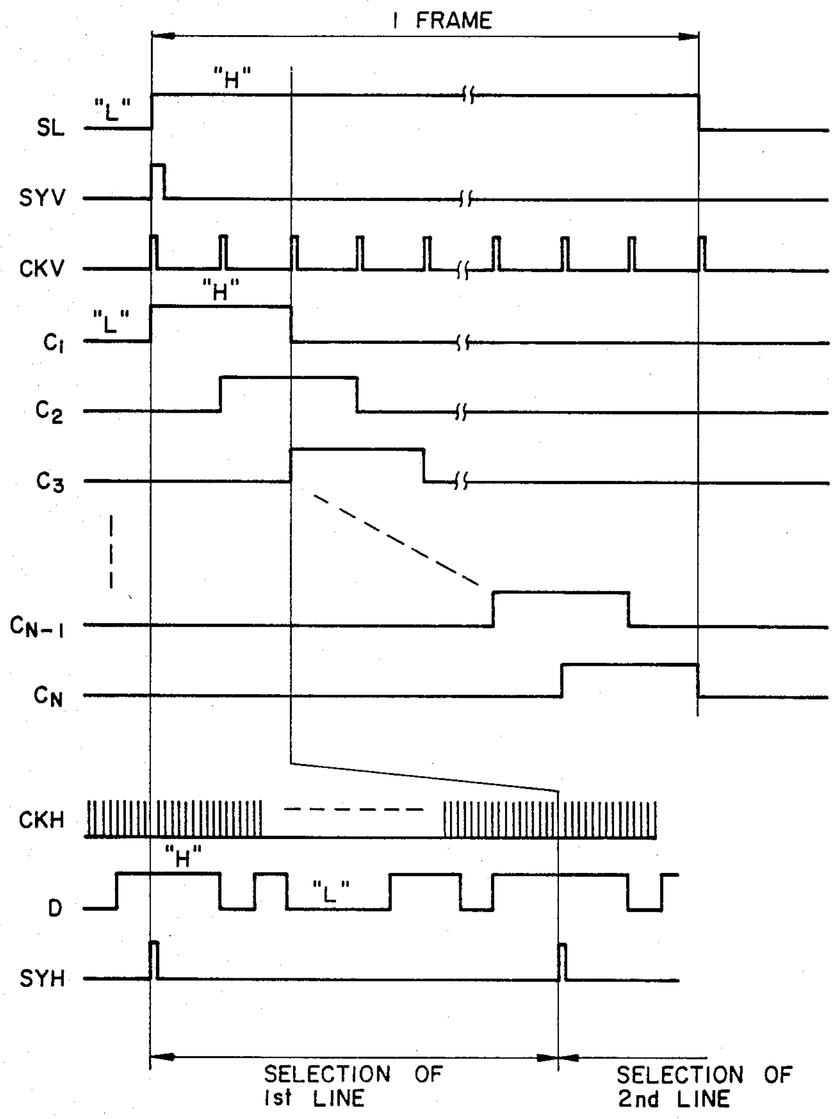

FIG. 35 is a flowchart of the operation of the circuit shown in FIG. 34.

During the re-write operation of one picture surface, the selection signal SL is set to "H" and the b input of the analog switch 127, to the non-wrte voltage $V_{NW}$. As to the scanning signal $C_l \sim C_N$, the "H" period is overlapped for the ½ period.

Though not shown in the drawing, the operation shown in FIG. 35 may be effected only for the re-write portion.

Furthermore, the relation between the scanning voltage $V_X$ and the signal voltage $V_Y$ shown in FIGS. 29 and 30 is not limitative, in particular.

Furthermore, though it is convenient to use a liquid crystal panel whose display state exhibits bi-stability, the characteristics of the liquid crystal are not particularly limitative so long as a ferroelectric liquid crystal is used.

Figure 36:
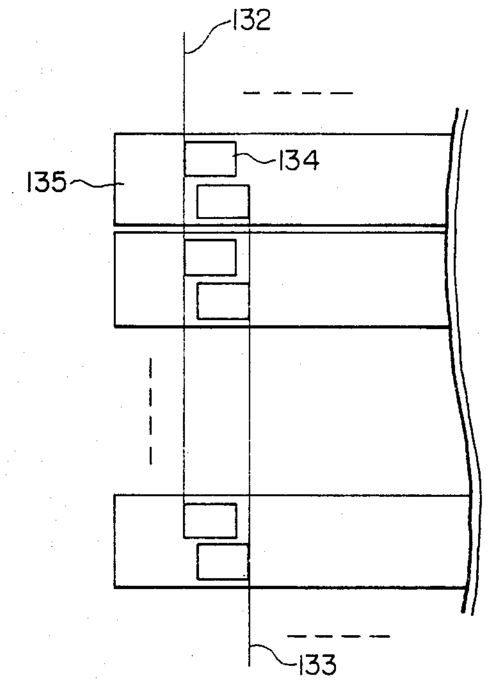
FIGS. 36 and 37 show one example of the liquid crystal panel which is used in the present invention.

FIG. 36 shows another embodiment of the liquid crystal panel used in the present invention. Reference numerals 132 and 133 represent signal electrodes, 134 is a pixel and 135 is a scanning electrode. In order to make matrix driving of this liquid crystal panel, the initialization operation and the write operation are made for each scanning electrode (for every two lines). As a result, the write time FIG. 1(*a*) can be particularly reduced to the half of the liquid crystal panel shown in FIG. 28(*a*).

Figure 37:
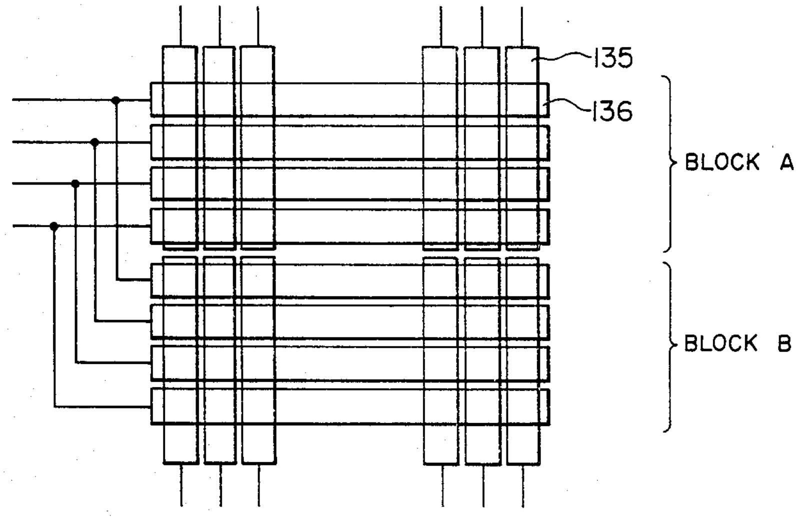

Further, FIG. 37 shows still another embodiment of the liquid crystal panel. Reference numeral 135 represent a signal electrode and 136 is a scanning electrode. The picture surfaces of the blocks A and B are simultaneously re-written by the driving method shown in FIG. 38(*b*). As a result, the re-write time can be reduced by half in the same way as in FIG. 36.

Figure 39A:
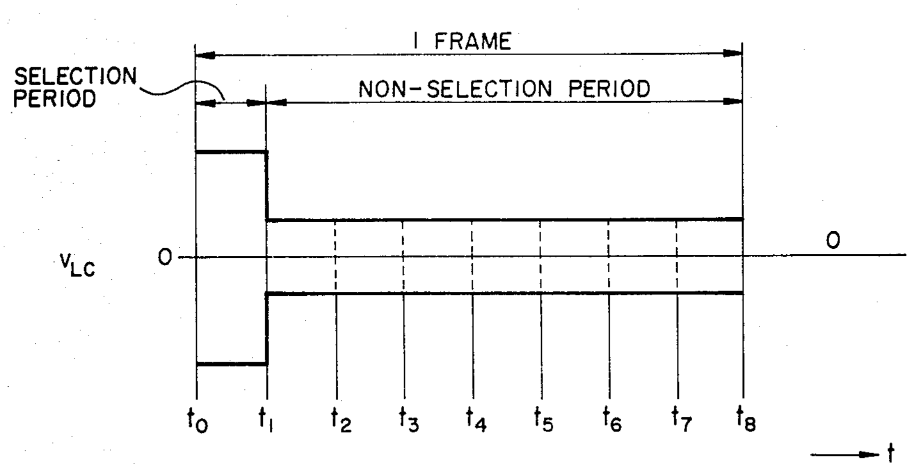
FIGS. 39*a*, 39*b* and 39*c* show schematically the line sequence time-division waveforms in accordance with the present invention.
Figure 39B:
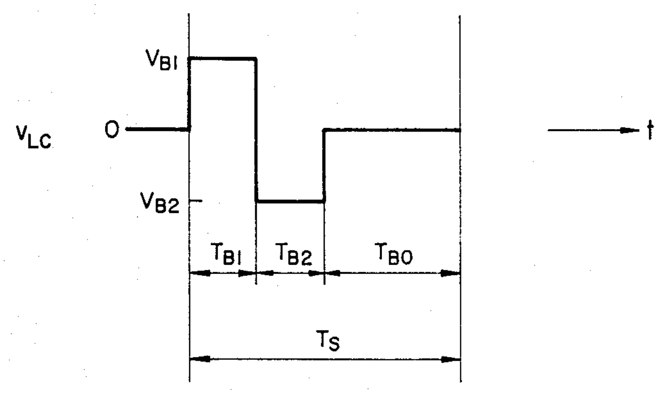
Figure 39C:
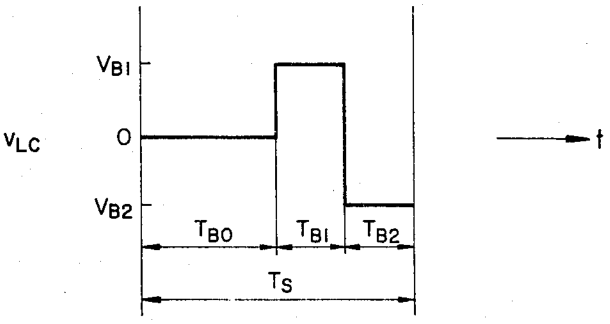

FIG. 39 shows schematically the line sequence time-division driving waveforms in accordance with the present invention. FIG. 39(*a*) shows schematically the driving voltage $V_{LC}$ of the liquid crystal. A first voltage is applied primarily in the selection period ($t_0 \sim t_1$) to determine the light transmission state of the liquid crystal and a bias voltage as a second voltage is applied primarily in the non-selection period ($t_1 \sim t_8$).

FIGS. 39(*b*) and 39(*c*) show one example of the waveform of the bias voltage as the second characterizing feature of the present invention. The period $T_S$ is equal to the period for selecting one line. The voltage values $V_{B1}$, $V_{B2}$ and the pulse widths $T_{B1}$, $T_{B2}$ are set at which the display state of the liquid crystal does not inverse substantially.

The term "voltage that does not substantially cause the inversion of the display state" means that though the liquid crystal molecules in the bulk (near the center of liquid crystal layer) are inversed, they are not inversed in the proximity of the electrodes or the liquid crystal orientation film.

The phenomenon described above will be explained optically. When a third voltage such as 0 V, an A.C. voltage of from several kHz to some dozens of kHz or no application of the scanning and signal voltages is made as the impressed voltage after removal of the bias voltage, the liquid crystal molecules return to the light transmission state determined in the selection period (such as the display state in the display mode), and this phenomenon will be hereinafter referred to as "relaxation".

If $V_{B1} = V_{B2}$ and $T_{B1} = T_{B2}$, the mean values become zero (0) and the D.C. component becomes zero, too and this is convenient for the life of the liquid crystal.

On the other hand, the $T_{B0}$ period (about 0 V) is set to be longer than the time $t_s$ (relaxation time) in which relaxation described above occurs. This will be explained with reference to FIGS. 40 and 41.

Figure 40:
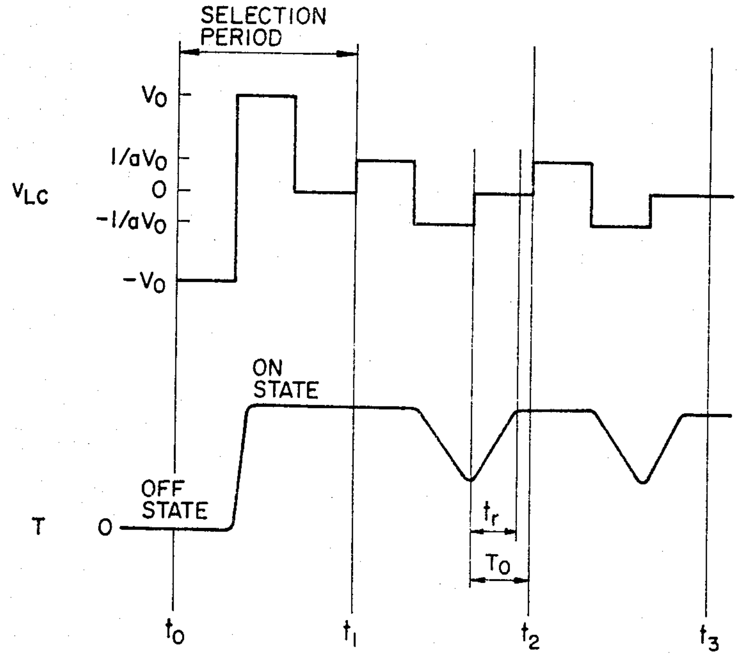
FIGS. 40 and 41 are explanatory views of a liquid crystal relaxation phenomenon.

As shown in FIG. 40, the liquid crystal is turned ON in the selection period. Next, after the negative voltage $(-1/aV_0)$ of the bias voltage of the liquid crystal is removed in the non-selection period, the impressed voltage is again made to be about 0 V for a period $T_0$ longer than the time $t_r$ before the liquid crystal molecules again return to the ON state. Hereinafter, the voltage impressed in the period $T_0$ will be referred to as "an erasing voltage". This erasing voltage is substantially the threshold voltage of the liquid crystal.

Figure 41:
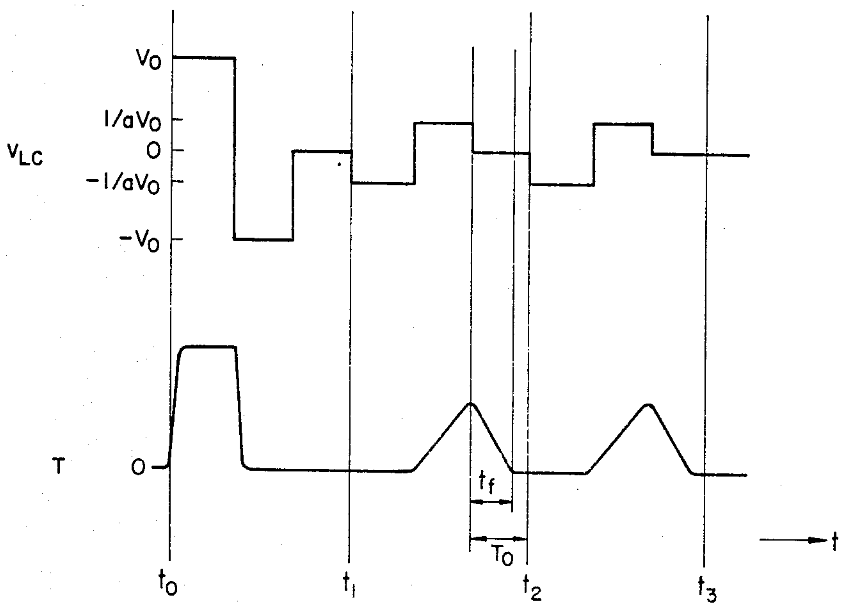

FIG. 41 shows the state opposite to the operation described above.

The relaxation time $t_r$ and $t_f$ shown in FIGS. 40 and 41 are sometimes not equal to each other depending particularly upon the orientation film and the orientation processing method. In this case, the erasing voltage is applied for a period longer than the longer period of these two periods $t_r$ and $t_f$. Incidentally, the longer period of $t_r$ and $t_f$ will be referred to as the "relaxation time $t_0$".

As described above, since the insertion time $T_0$ of the erasing voltage is set to satisfy the relation $T_0 \gtrsim t_0$, the transmission light quantity varies within a limited period but it becomes on an average a substantially constant light transmission quantity so that display flicker can be prevented.

Incidentally, symbol a represents a bias ratio. Though not particularly limitative, it is convenient if a is set to satisfy the relation $a \leqq 3$ because the voltage peak value applied to the liquid crystal in the semi-selection state, where the scanning electrodes are in the selection state but the signal electrodes are in the semi-selection state, becomes $\pm 1/aV_0$ or below.

Figure 42:
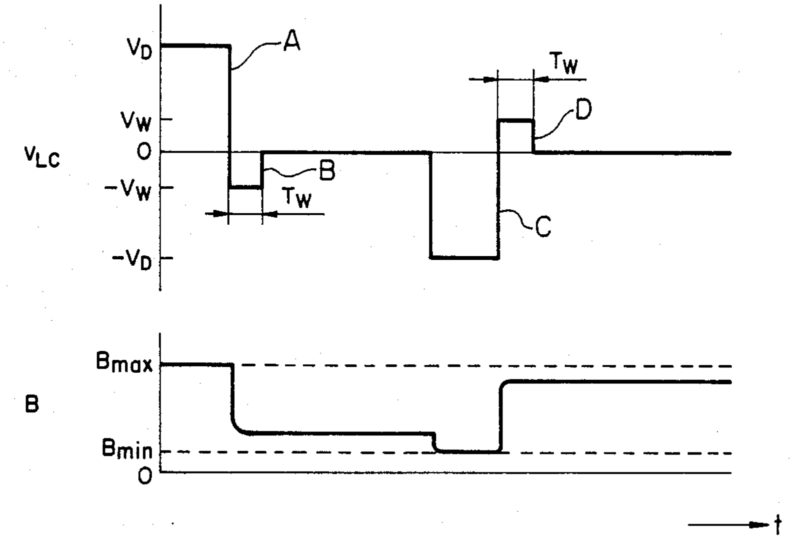

Here, the voltage $V_0$ shown in FIGS. 40 and 41 will be defined. FIG. 42 shows a liquid crystal driving voltage $V_{LC}$ and the change of brightness B of the liquid crystal at that time in order to measure the electro-optical characteristics of the liquid crystal. The driving voltage $V_{LC}$ consists of pulses A, B, C and D. Among them, the pulses A, B are applied to measure the optical characteristics when the liquid crystal is in the display OFF state and the pulses C, D are applied to measure the optical characteristics when the liquid crystal is in the display ON state.

Figure 43:
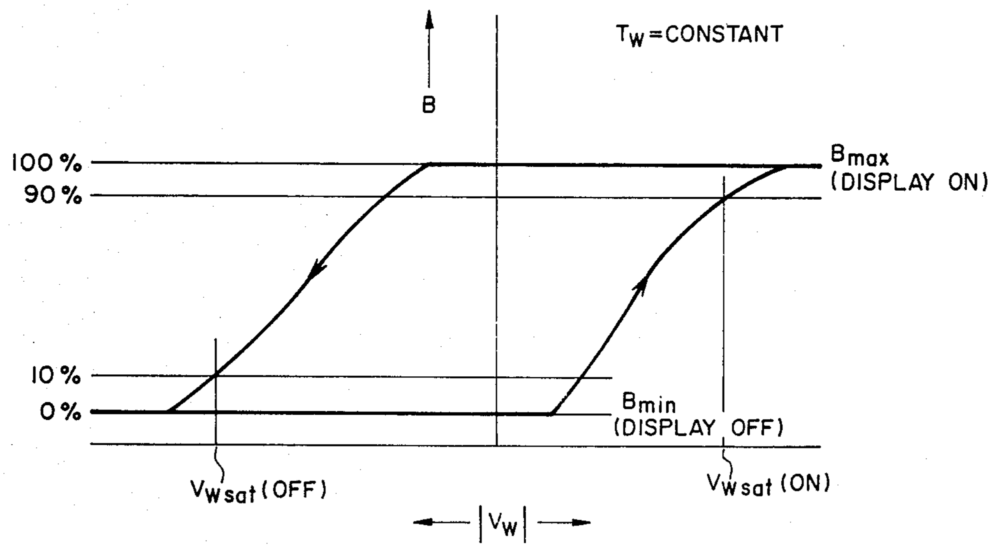

The result of measurement at this time is shown in FIG. 43. First of all, in order to measure the optical characteristics when the liquid crystal is in the display OFF state, the liquid crystal is set to the display ON state by the pulse A and thereafter the pulse B having an opposite polarity to the pulse A, a pulse width $T_W$ and a peak value $-V_W$, is applied. To measure the optical characteristics when the liquid crystal is in the display ON state, the pulse C is applied to set the liquid crystal to the display OFF state and then the pulse D having an opposite polarity to the pulse C, a pulse width $T_W$ and a peak value $V_W$, is applied.

The pulse width and peak value of the pulses A and C as the first voltage that sets the liquid crystal to the display ON and OFF state assumes the value at which the liquid crystal exhibits bistability. Optically, it is a driving condition in which the brightness B gets into saturation. From the aspect of the liquid crystal molecule level, the direction of the liquid crystal molecules near the boundary with the substrate is substantially in agreement with the direction of the liquid crystal molecules near the center of the liquid crystal layer. In other words, it is the state where the dip ole moments of the liquid cyrstal molecules are aligned in the direction of the electric field throughout the liquid crystal layer.

In FIG. 43, $|V_W|$ at which the brightness B increases and decreases by 90% when the peak value $|V_W|$ of the pulses B, D is changed is defined as $V_{wsat(on)}$ and $V_{wsat(off)}$, respectively.

The experiments carried out by the present inventors represent that $V_{wsat(on)}$ and $V_{wsat(off)}$ are not always in agreement with each other depending upon the material of liquid crystal, the orientation film and the orientation method. They change also in accordance with the pulse width of the pulses B, D.

Here, the greater one of $V_{wsat(on)}$ and $V_{wsat(off)}$ when the pulse width $T_W$ is set to be constant is defined as $V_0$. Quite naturally, $V_0$ changes with the pulse width $T_W$.

The substantial threshold voltage of the liquid crystal is the voltage at which the brightness B does not change when the pulse width $T_W$ of the pulses B, D shown in FIG. 16 is $\infty$, that is, the voltage that does not affect the brightness determined by the pulses A, C.

Figure 44:
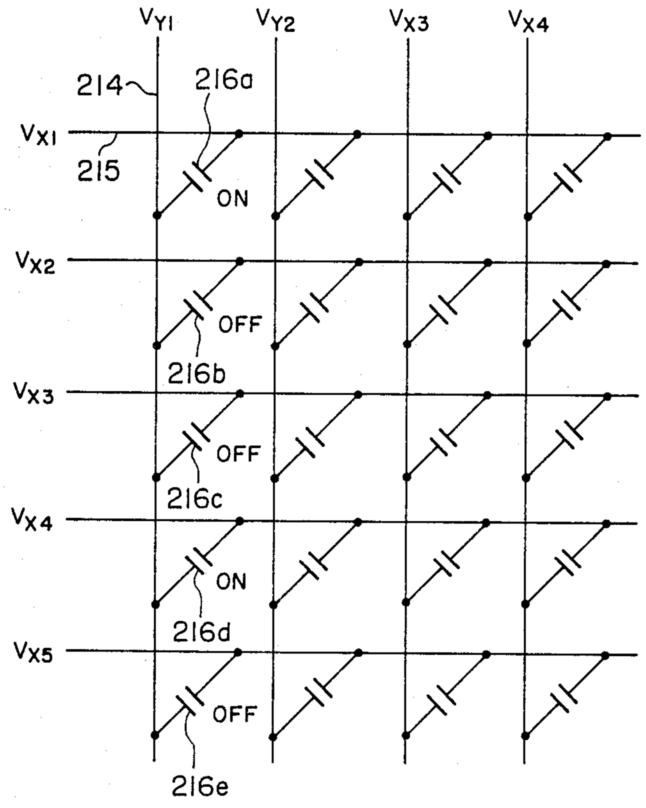
FIG. 44 is an equivalent electric circuit diagram of the liquid crystal panel used in the present invention.

Next, a definite driving waveform will be explained. FIG. 44 shows a liquid crystal panel consisting of the signal electrodes 14, the scanning electrodes 15 and the pixels 216*a*~216*e*. Now, the scanning voltage and the signal voltage when the pixels of the pixels 216*a*~216*e* are in the display state shown in the drawing, and the voltage waveform applied to the pixel 216*a* will be explained.

Figure 45:
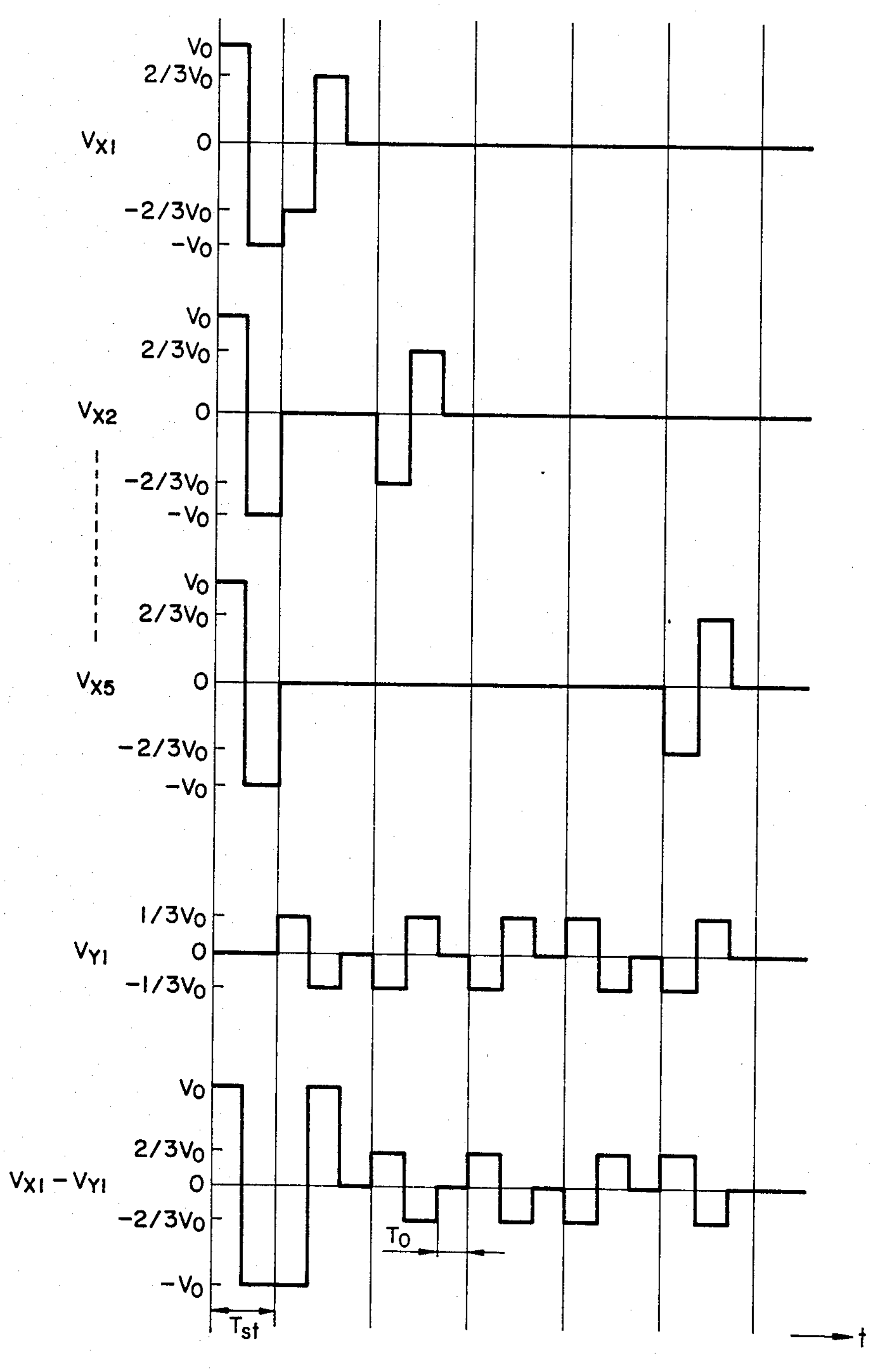

FIG. 45 shows a driving method which applies the first voltage only for a period $T_{st}$ before the start of scanning so as to bring all the pixels into the display OFF state, and then a voltage holding this display state (a second voltage: $\pm\frac{1}{3}V_0$, third voltage: 0 V) or a first voltage $\pm V_0$, 0 V) for inversing the display state to the liquid crystal. Incidentally, all the pixels may be brought into the display ON state during the $T_{st}$ period. Through a=3 in the drawing, this is not particularly limitative.

Figure 46:
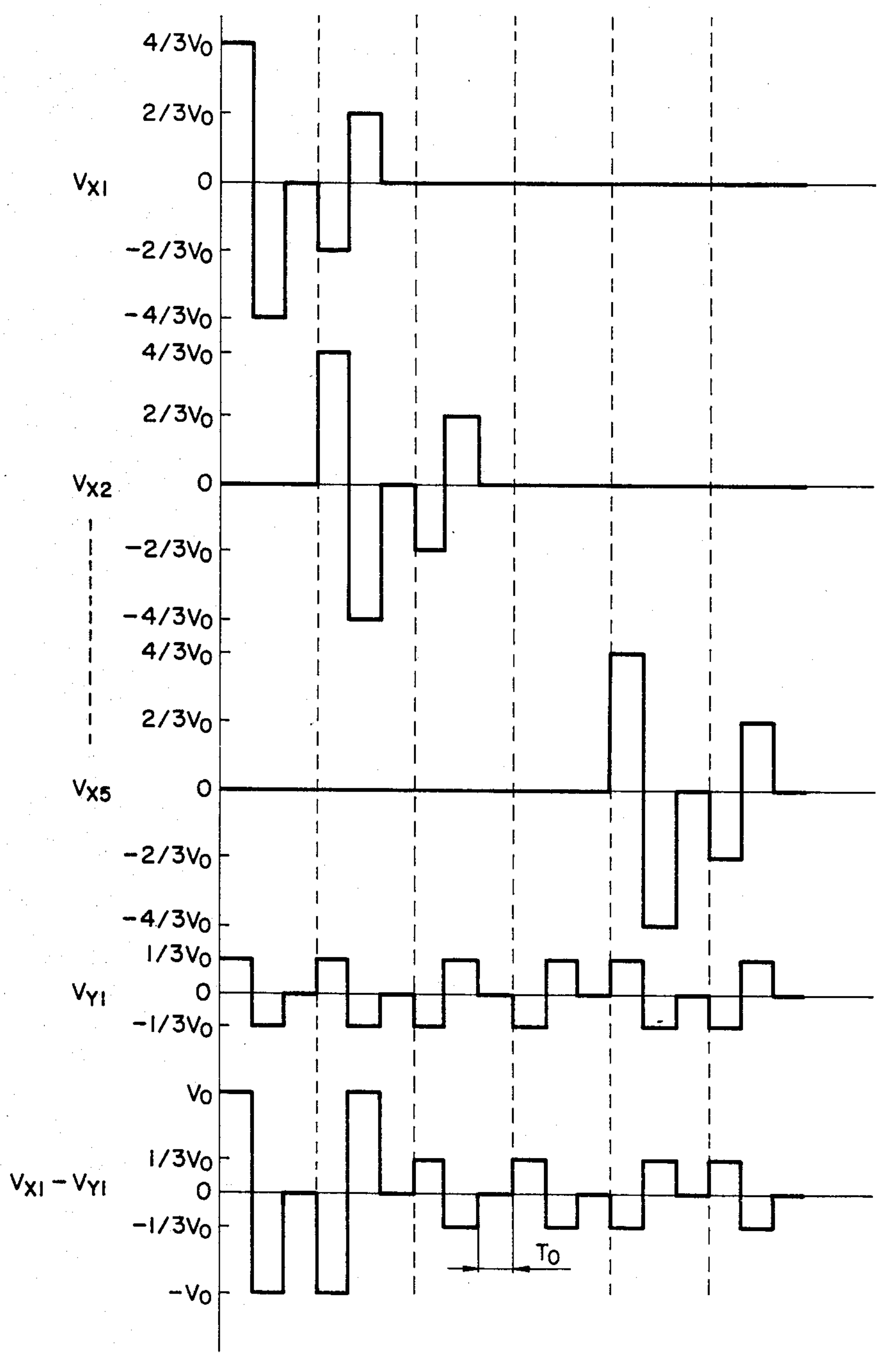

FIG. 46 shows another driving method. This method applies in advance the first voltage to the pixels of one line before the selection period and then applies a voltage (the second voltage: $\pm\frac{1}{3}V_0$, the third voltage: 0) for holding the display state or the inversing (turn-on) first voltage ($\pm V_0$, 0 V) to the liquid crystal. The display state may be set to the ON state.

Figure 47:
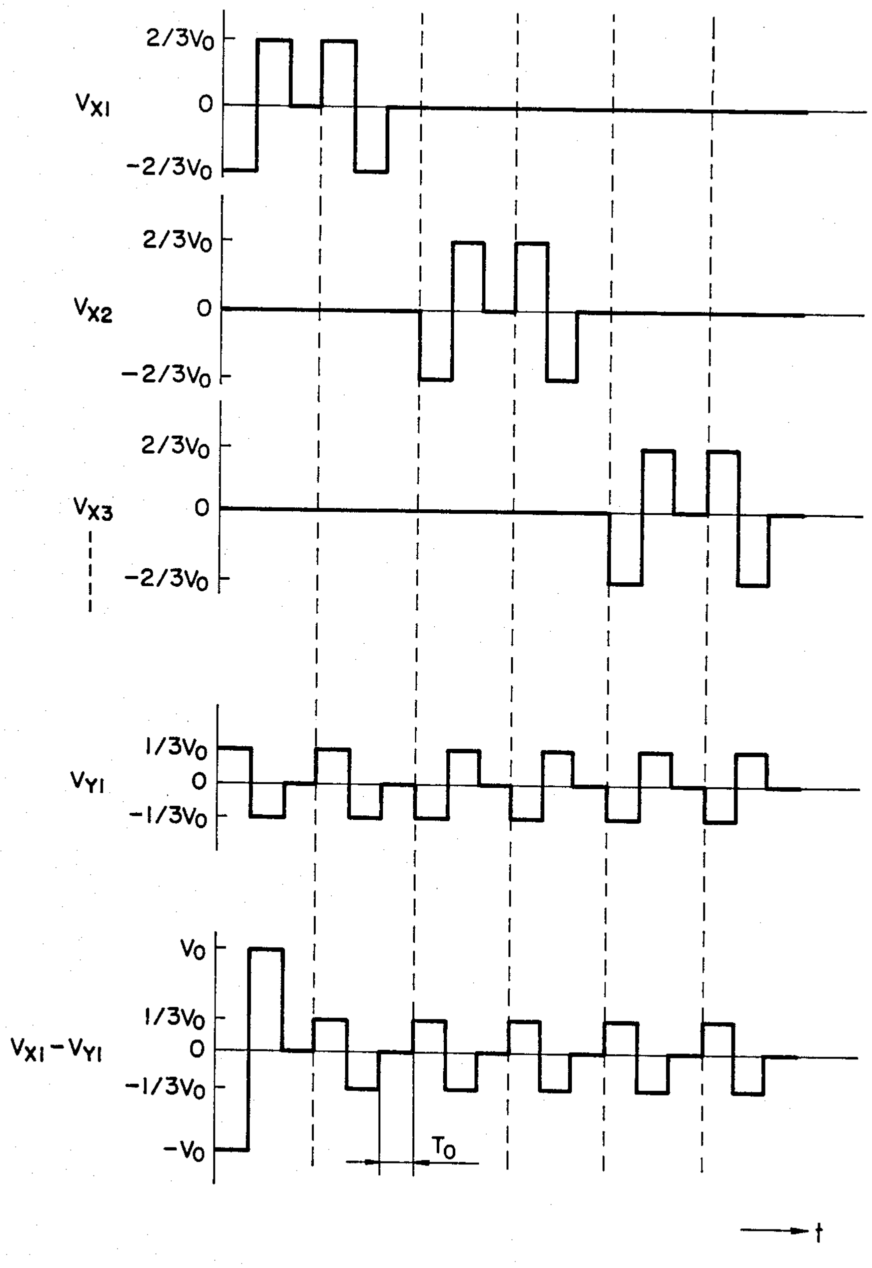

FIG. 47 shows still another driving method. This method is characterized in that the display ON state or the display OFF state is determined in one selection period.

Figure 38A:
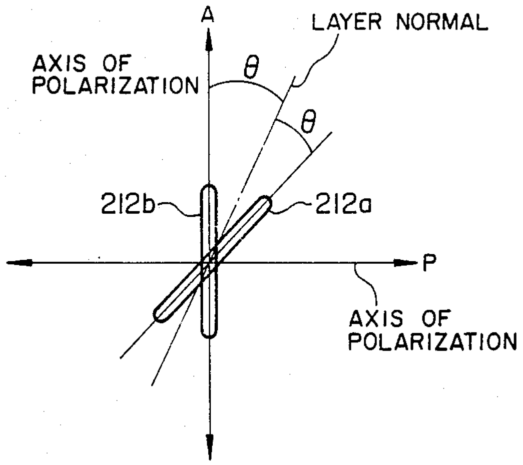
Figure 38B:
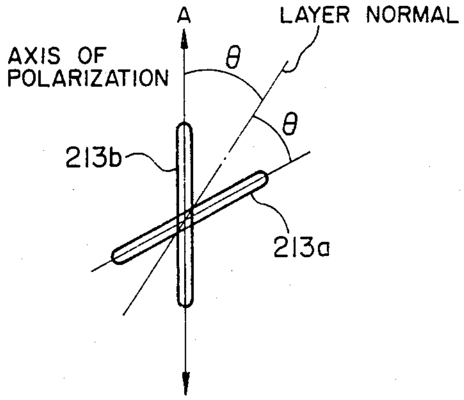

In the orientation state of theliquid crystal molecules shown in FIG. 38, the orientation of the liquid crystal molecules changes by $\theta$ from the layer normal depending upon the polarity of the voltage. At this time, there is a difference in the change of $\theta$ depending upon the orientation film and the orientation processing condition even when the conditions of the positive and negative voltages are the same. This phenomenon is particularly remarkable in the proximity of the electrodes. This phenomenon causes the difference in the threshold voltage of the liquid crystal when the voltages of the positive and negative polarities are applied to the liquid crystal.

Figure 48:
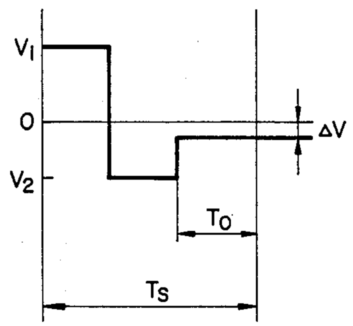
FIG. 48 shows another example of a bias voltage waveform.
Figure 49A:
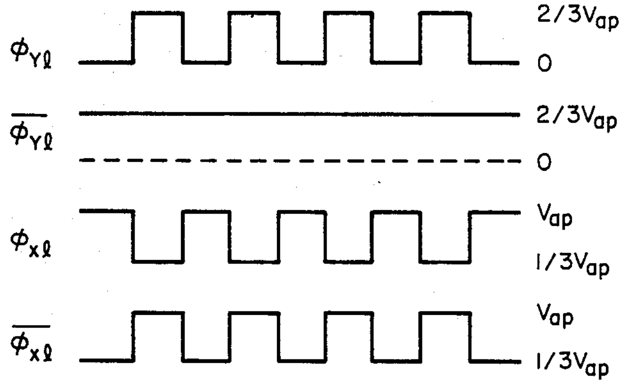
Figure 49B:
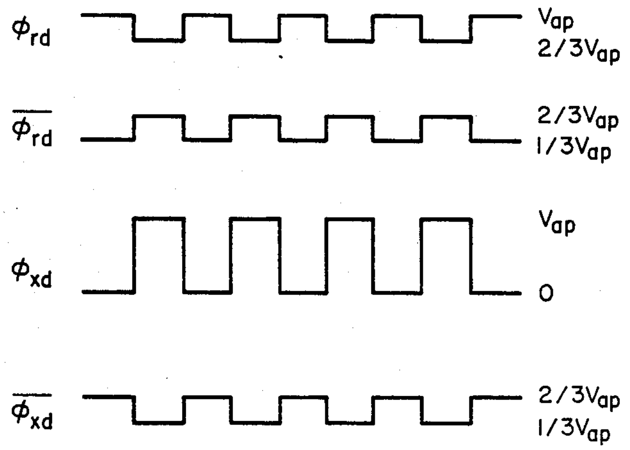
Figure 50:
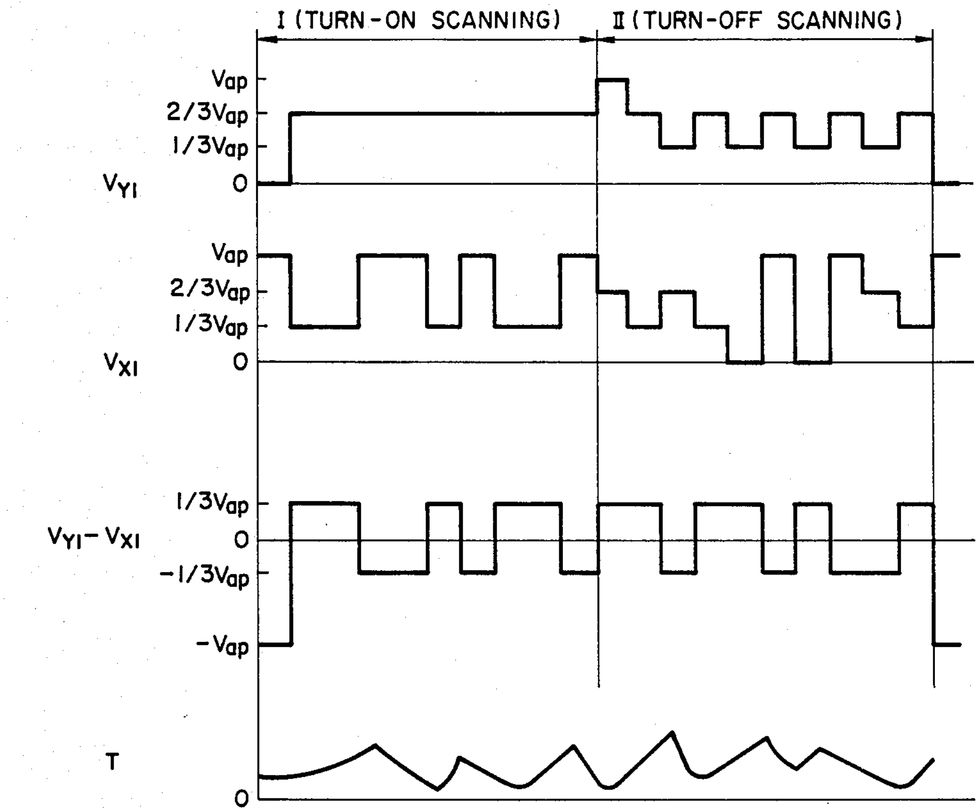
Figure 51:
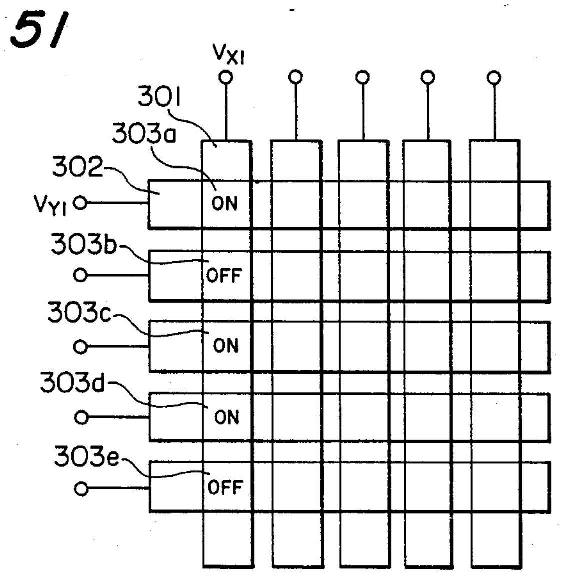

Accordingly, excellent display can be obtained by shifting the bias voltage shown in FIG. 39(*b*) from 0 to $\Delta V$ in the $T_0$ period shown in FIG. 48. Here, this example illustrates the case where the liquid crystal whose threshold voltage of the positive polarityis higher than that of the negative polarity is driven.

$V_0$ and the like are determined so that the mean value becomes 0 in the $T_s$ period.

The driving methods described above can also be applied to liquid crystal panels than do not exhibit bistability.

Furthermore, the present invention can be applied to optical switching devices for use in liquid crystal printers, and the like.

The present invention can accomplish a large capacity display because it can shorten the re-write time of one picture surface of a one-line selection time. The present invention can display video signals on the real time basis.

In accordance with the present invention, the light transmission state of the liquid crystal does not change in accordance with the voltage applied to the liquid crystal during the non-selection period, and the variance of the light transmission state does not occur in consequence. Since this results in the prevention of contrast, a high quality liquid crystal device can be obtained.

What is claimed is:

1. In a matrix line-at-a-time driving apparatus of a liquid crystal device having a ferroelectric liquid crystal interposed between X and Y electrodes and pixels arranged in lines, a liquid crystal driving appratus comprising:

first driving means for applying a voltage of one polarity simultaneously to the pixels for one line to bring said pixels into a first transmission stable state; and second driving means for applying a voltage to each of said pixels in said line, said voltage being either of the other polarity to bring said pixels into a second light transmission stable state or effective to hold the first light transmission state in accordance with display signals, and wherein said pixels of an N+1)th line are driven by said first driving means when said pixels of an Nth line are driven by said second driving means.

2. An apparatus as defined in claim 1, wherein the first driving means voltage is effective for causing each liquid crystal pixel in a line to have a light OFF state and the driving voltage of opposite polarity from the second driving means is effective for causing a liquid crystal pixel previously in a light OFF state to transfer to a light ON state.

3. An apparatus as defined in claim 1, wherein the first driving means voltage is effectie for causing each liquid crystal pixel in a line to have a light ON state and the driving voltage of opposite polarity from the second driving means is effective for causing a liquid crystal pixel previously in a light ON state to transfer to a light OFF state.

4. In a matrix line-at-a-time driving apparatus of a liquid crystal device having a ferroelectric liquid crystal interposed between X and Y electrodes and pixels arranged in lines, a liquid crystal driving apparatus comprising:

first driving means for applying a voltage of one polarity simultaneously to the pixels for one line to bring said pixels into a first transmission stable state;

second driving menas responsive to signals relating to information that is to be displayed, said second driving means being effective to apply one of two voltages to each pixel in said one line, one of said voltages having a polarity opposite to said one polarity and being effective to bring a pixel into a second light transmission stable state;

and the other of said two voltages being of a magnitude and polarity to hold a pixel in the first light transmission stable state, and means advancing the first driving means to apply its voltage simultaneously to the pixels of a second line in said matrix during the same time interval that the pixels of said one line are driven by said second driving means.

5. The apparatus as defined in claim 4 wherein said first driving means voltage is effective for causing each liquid crystal pixel in a line to have a light OFF state and the driving voltage of opposite polarity from the second driving means is effective for causing a liquid crystal pixel previously in a light OFF state to transfer to a light ON state.

6. The apparatus as defined in claim 5 wherein the first driving menas voltage is effective for causing each liquid crystal pixel in a line to have a light ON state and the driving voltage of opposite polarity from the second driving means is effective for causing a liquid crystal pixel previously in a light ON state to transfer to a light OFF state.

7. A method of operating a liquid crystal display device which includes a matrix of ferroelectric liquid crystals aligned as pixels in parallel lines, the method comprising the steps of:

applying a first voltage of a first polarity during a first time interval simultaneously to all of the pixels in a first line of said matrix to bring all of the pixels to the uniform light transmission stable state;

providing a pattern of voltages which voltages have either an opposite or same polarity as said first voltage in accordance with a desired display with the voltages of opposite polarity being effective to bring associated pixels within a second light transmission stable state; and applying said pattern of voltages during a second time interval to the pixels of said first line to produce a stable display according to the applied voltage pattern while concurrently applying a first voltage of a first polarity simultaneously of all of the pixels in a second line of said matrix to bring all of the pixels in said second line into a uniform light transmission stable state.

8. A method according to claim 7 further comprising the steps of:

providing a second pattern of voltages which voltages have either an opposite or same polarity as said first voltage in accordance with a desired display for said second line with the voltages of opposite polarity being effective to bring associated pixels within a second light transmission stable state; and applying said pattern of voltages during a third time interval to the pixels of said second line to produce a stable display according to the second applied voltage pattern which concurrently applying a first voltage of a first polarity simultaneously to all of the pixels in a third line of said matrix to bring all of the pixels in said third line into a uniform light transmission stable state.

* * * * *